(12) United States Patent
Sharma et al.

(10) Patent No.: US 7,958,359 B2
(45) Date of Patent: Jun. 7, 2011

(54) ACCESS CONTROL SYSTEMS

(75) Inventors: Ravi K. Sharma, Hillsboro, OR (US);
Marc D. Miller, Corte Madera, CA
(US); Kenneth L. Levy, Stevenson, WA
(US)

(73) Assignee: Digimarc Corporation, Beaverton, OR (US)

( * ) Notice: Subject to any disclaimer, the term of this patent is extended or adjusted under 35 U.S.C. 154(b) by 1638 days.

(21) Appl. No.: 10/275,197

(22) PCT Filed: Apr. 30, 2001

(86) PCT No.: PCT/US01/14014
§ 371 (c)(1),
(2), (4) Date: Mar. 4, 2003

(87) PCT Pub. No.: WO01/84438
PCT Pub. Date: Nov. 8, 2001

(65) Prior Publication Data
US 2004/0128512 A1 Jul. 1, 2004

(51) Int. Cl.
*H04L 9/32* (2006.01)
*G06K 9/00* (2006.01)
*G08B 19/00* (2006.01)
(52) U.S. Cl. ....... 713/176; 382/115; 340/5.82; 340/5.52
(58) Field of Classification Search .................. 713/176, 713/186; 382/115; 340/5.52, 5.82
See application file for complete search history.

(56) References Cited

U.S. PATENT DOCUMENTS

| | | | |
|---|---|---|---|
| 4,590,366 A | 5/1986 | Rothfjell | |
| 4,675,746 A | 6/1987 | Tetrick et al. | |
| 4,689,477 A | 8/1987 | Goldman | |
| 4,728,984 A | 3/1988 | Daniele | |
| 4,807,031 A | 2/1989 | Broughton et al. | |
| 4,972,476 A | 11/1990 | Nathans | |
| 5,018,767 A | 5/1991 | Wicker | |
| 5,091,966 A | 2/1992 | Bloomberg et al. | |
| 5,221,833 A | 6/1993 | Hecht | |
| 5,237,164 A | 8/1993 | Takada | |
| 5,284,364 A | 2/1994 | Jain | |
| 5,319,453 A | 6/1994 | Copriviza et al. | |
| 5,329,108 A | 7/1994 | Lamoure | |
| 5,337,361 A | 8/1994 | Wang et al. | |
| 5,379,345 A | 1/1995 | Greenberg | |
| 5,384,846 A | 1/1995 | Berson et al. | |
| 5,411,259 A | 5/1995 | Pearson et al. ............. 273/93 C |

(Continued)

FOREIGN PATENT DOCUMENTS
DE 29 43 436 5/1981
(Continued)

OTHER PUBLICATIONS

U.S. Appl. No. 09/342,688, filed Jun. 29, 1999, Rodriguez et al.

(Continued)

*Primary Examiner* — Techane J Gergiso

(57) ABSTRACT

The present invention relates generally to access control. One claim recites a method of determining whether to allow access to a location, including: receiving optical data from an optical sensor, the optical data being associated with an object presented to the optical sensor, wherein the object comprises optically-detectable, machine-readable indicia encoded in a predetermined symbology thereon, the indicia including at least an orientation component; determining an orientation of the orientation component; obtaining from a data store a predetermined orientation; and comparing the predetermined orientation with the determined orientation to decide whether to allow access to the location. Of course, other claims are provided as well.

33 Claims, 12 Drawing Sheets

U.S. PATENT DOCUMENTS

| | | | |
|---|---|---|---|
| 5,436,970 A | 7/1995 | Ray et al. | |
| 5,449,896 A | 9/1995 | Hecht et al. | |
| 5,471,533 A | 11/1995 | Wang et al. | |
| 5,481,377 A | 1/1996 | Udagawa et al. | 358/501 |
| 5,495,581 A | 2/1996 | Tsai | |
| 5,515,451 A | 5/1996 | Tsuji et al. | |
| 5,517,336 A | 5/1996 | Molee | 359/1 |
| 5,629,770 A | 5/1997 | Brassil et al. | |
| 5,636,292 A | 6/1997 | Rhoads | 382/232 |
| 5,646,997 A | 7/1997 | Barton | |
| 5,652,626 A | 7/1997 | Kawakami et al. | |
| 5,659,726 A | 8/1997 | Sandford, II et al. | |
| 5,694,471 A | 12/1997 | Chen et al. | |
| 5,719,950 A * | 2/1998 | Osten et al. | 382/115 |
| 5,721,788 A | 2/1998 | Powell et al. | |
| 5,740,244 A | 4/1998 | Indeck et al. | |
| 5,748,763 A * | 5/1998 | Rhoads | 382/115 |
| 5,765,176 A | 6/1998 | Bloomberg | 707/514 |
| 5,768,426 A | 6/1998 | Rhoads | |
| 5,778,102 A | 7/1998 | Sandford, II et al. | 382/251 |
| 5,787,186 A | 7/1998 | Schroeder | |
| 5,796,827 A * | 8/1998 | Coppersmith et al. | 713/182 |
| 5,799,092 A | 8/1998 | Kristol et al. | |
| 5,810,666 A | 9/1998 | Mero et al. | 463/42 |
| 5,812,252 A * | 9/1998 | Bowker et al. | 356/71 |
| 5,835,639 A | 11/1998 | Honsinger et al. | |
| 5,841,886 A | 11/1998 | Rhoads | |
| 5,845,008 A | 12/1998 | Katoh et al. | |
| 5,864,622 A | 1/1999 | Marcus | |
| 5,864,623 A | 1/1999 | Messina et al. | |
| 5,892,824 A * | 4/1999 | Beatson et al. | 713/186 |
| 5,902,353 A | 5/1999 | Reber et al. | 709/219 |
| 5,907,149 A | 5/1999 | Marckini | |
| 5,912,974 A | 6/1999 | Holloway et al. | |
| 5,917,928 A * | 6/1999 | Shpuntov et al. | 382/124 |
| 5,933,086 A | 8/1999 | Tischendorf et al. | |
| 5,949,055 A | 9/1999 | Fleet et al. | |
| 5,974,150 A * | 10/1999 | Kaish et al. | 713/179 |
| 6,011,857 A | 1/2000 | Sowell et al. | 382/100 |
| 6,024,287 A | 2/2000 | Takai et al. | |
| 6,031,914 A | 2/2000 | Tewfik et al. | 380/54 |
| 6,061,451 A | 5/2000 | Muratani et al. | 380/201 |
| 6,064,764 A | 5/2000 | Bhaskaran et al. | 382/183 |
| 6,076,738 A | 6/2000 | Bloomberg et al. | |
| 6,082,774 A | 7/2000 | Schlauch | 283/67 |
| 6,115,482 A * | 9/2000 | Sears et al. | 382/114 |
| 6,148,091 A | 11/2000 | DiMaria | |
| 6,208,746 B1 * | 3/2001 | Musgrave | 382/100 |
| 6,216,228 B1 | 4/2001 | Chapman et al. | 713/176 |
| 6,256,737 B1 | 7/2001 | Bianco et al. | |
| 6,263,087 B1 | 7/2001 | Miller | |
| 6,289,108 B1 | 9/2001 | Rhoads | |
| 6,292,092 B1 | 9/2001 | Chow et al. | |
| 6,304,966 B1 | 10/2001 | Shimizu | 713/100 |
| 6,309,690 B1 | 10/2001 | Brogger et al. | 427/7 |
| 6,311,214 B1 | 10/2001 | Rhoads | 709/217 |
| 6,332,031 B1 | 12/2001 | Rhoads et al. | 382/100 |
| 6,343,138 B1 | 1/2002 | Rhoads | |
| 6,345,104 B1 | 2/2002 | Rhoads | 382/100 |
| 6,385,330 B1 | 5/2002 | Powell et al. | 382/100 |
| 6,408,082 B1 | 6/2002 | Rhoads et al. | 382/100 |
| 6,408,330 B1 | 6/2002 | DeLaHuerga | |
| 6,417,663 B1 | 7/2002 | Piernot et al. | |
| 6,424,725 B1 | 7/2002 | Rhoads et al. | |
| 6,449,377 B1 | 9/2002 | Rhoads | 382/100 |
| 6,463,416 B1 | 10/2002 | Messina | |
| 6,496,595 B1 | 12/2002 | Puchek et al. | |
| 6,522,770 B1 | 2/2003 | Seder et al. | |
| 6,539,101 B1 * | 3/2003 | Black | 382/124 |
| 6,546,112 B1 | 4/2003 | Rhoads | |
| 6,574,350 B1 | 6/2003 | Rhoads et al. | |
| 6,607,127 B2 | 8/2003 | Wong | |
| 6,614,914 B1 | 9/2003 | Rhoads et al. | |
| 6,628,810 B1 * | 9/2003 | Harkin | 382/116 |
| 6,636,615 B1 | 10/2003 | Rhoads et al. | |
| 6,651,168 B1 | 11/2003 | Kao et al. | |
| 6,668,069 B1 * | 12/2003 | Herley | 382/100 |
| 6,674,886 B2 | 1/2004 | Davis et al. | |
| 6,675,165 B1 | 1/2004 | Rothschild | |
| 6,683,966 B1 | 1/2004 | Tian et al. | |
| 6,694,041 B1 | 2/2004 | Brunk | |
| 6,714,683 B1 | 3/2004 | Tian | |
| 6,721,440 B2 | 4/2004 | Reed et al. | |
| 6,724,912 B1 | 4/2004 | Rhoads | |
| 6,727,996 B1 | 4/2004 | Silverbrook et al. | |
| 6,735,324 B1 | 5/2004 | McKinley et al. | |
| 6,735,695 B1 * | 5/2004 | Gopalakrishnan et al. | 713/186 |
| 6,748,533 B1 * | 6/2004 | Wu et al. | 713/176 |
| 6,751,336 B2 | 6/2004 | Zhao et al. | |
| 6,766,040 B1 * | 7/2004 | Catalano et al. | 382/115 |
| 6,775,776 B1 * | 8/2004 | Vogt et al. | 713/186 |
| 6,782,116 B1 | 8/2004 | Zhao et al. | |
| 6,788,800 B1 | 9/2004 | Carr et al. | |
| 6,830,196 B1 | 12/2004 | Silverbrook et al. | |
| 6,832,730 B2 | 12/2004 | Conner et al. | |
| 6,845,453 B2 | 1/2005 | Scheidt et al. | |
| 6,866,195 B2 | 3/2005 | Knowles | |
| 6,871,789 B2 | 3/2005 | Hilton et al. | |
| 6,922,779 B1 * | 7/2005 | Lapstun et al. | 713/182 |
| 6,940,545 B1 * | 9/2005 | Ray et al. | 348/222.1 |
| 6,947,571 B1 | 9/2005 | Rhoads et al. | |
| 6,965,873 B1 | 11/2005 | Rhoads | |
| 7,027,612 B2 | 4/2006 | Patterson et al. | |
| 7,043,052 B2 | 5/2006 | Rhoads | |
| 7,050,603 B2 | 5/2006 | Rhoads et al. | |
| 7,058,687 B2 | 6/2006 | Rhoads | |
| 7,072,490 B2 | 7/2006 | Stach | |
| 7,080,041 B2 | 7/2006 | Nagel | |
| 7,099,019 B2 | 8/2006 | Silverbrook et al. | |
| 7,111,168 B2 | 9/2006 | Lofgren et al. | |
| 7,178,025 B2 | 2/2007 | Scheidt et al. | |
| 7,181,042 B2 | 2/2007 | Tian | |
| 7,191,156 B1 | 3/2007 | Seder | |
| 7,239,734 B2 | 7/2007 | Alattar et al. | |
| 7,412,072 B2 | 8/2008 | Sharma et al. | |
| 7,502,937 B2 | 3/2009 | McKinley et al. | |
| 7,778,442 B2 | 8/2010 | Sharma et al. | |
| 2001/0007130 A1 * | 7/2001 | Takaragi | 713/186 |
| 2001/0016052 A1 | 8/2001 | Miller | |
| 2001/0019611 A1 | 9/2001 | Hilton | |
| 2001/0023421 A1 | 9/2001 | Numano et al. | |
| 2001/0024512 A1 * | 9/2001 | Yoronka et al. | 382/103 |
| 2001/0025342 A1 * | 9/2001 | Uchida | 713/186 |
| 2001/0026377 A1 | 10/2001 | Ikegami | |
| 2001/0049788 A1 | 12/2001 | Shur | |
| 2001/0055390 A1 | 12/2001 | Hayashi et al. | |
| 2002/0002679 A1 | 1/2002 | Murakami et al. | |
| 2002/0059523 A1 * | 5/2002 | Bacchiaz et al. | 713/200 |
| 2002/0126872 A1 | 9/2002 | Brunk et al. | |
| 2002/0126889 A1 | 9/2002 | Pikler et al. | |
| 2002/0131076 A1 | 9/2002 | Davis | |
| 2002/0170966 A1 | 11/2002 | Hannigan et al. | |
| 2003/0026421 A1 | 2/2003 | Morlet | |
| 2003/0026453 A1 | 2/2003 | Bradely et al. | |
| 2003/0052768 A1 | 3/2003 | Maune | |
| 2004/0036574 A1 | 2/2004 | Bostrom | |
| 2004/0128512 A1 | 7/2004 | Sharma et al. | |
| 2005/0013462 A1 | 1/2005 | Rhoads | |
| 2005/0047593 A1 | 3/2005 | Hampp | |
| 2005/0262350 A1 | 11/2005 | Boutant et al. | |
| 2005/0271246 A1 | 12/2005 | Sharma et al. | |
| 2008/0215636 A1 | 9/2008 | Lofgren et al. | |
| 2010/0009714 A1 | 1/2010 | Sharma et al. | |
| 2010/0071031 A1 | 3/2010 | Carter | |

FOREIGN PATENT DOCUMENTS

| | | |
|---|---|---|
| EP | 0 493 091 | 12/1991 |
| EP | 0 629 972 | 12/1994 |
| EP | 0 736 860 | 10/1996 |
| EP | 0 642 060 B1 | 4/1999 |
| EP | 1156660 | 11/2001 |
| EP | 1229672 A2 * | 8/2002 |
| JP | 03-185585 | 8/1991 |
| WO | WO 96/03286 | 2/1996 |
| WO | WO97/43736 | 11/1997 |
| WO | WO00/07356 | 2/2000 |
| WO | WO00/26749 | 5/2000 |

| WO | WO01/11890 | 2/2001 |
| WO | WO01/24113 | 4/2001 |
| WO | WO01/61987 | 8/2001 |
| WO | WO 01/84438 | 11/2001 |
| WO | WO02/09830 | 2/2002 |
| WO | WO02/13138 | 2/2002 |
| WO | WO02/088904 | 11/2002 |
| WO | WO 03/005291 | 1/2003 |

OTHER PUBLICATIONS

U.S. Appl. No. 09/343,101, filed Jun. 29, 1999, Davis et al.
U.S. Appl. No. 09/342,971, filed Jun. 29, 1999, Ridriguez et al.
U.S. Appl. No. 09/571,422, filed May 15, 2000, Rhoads et al.
U.S. Appl. No. 09/630,243, filed Jul. 31, 2000, McKinley et al.
U.S. Appl. No. 10/139,147, filed May 2, 2002, Hannigan et al.
PCT International Search Report for PCT/US01/14014, dated Aug. 28, 2001.
PCT International Preliminary Examination Report for PCT/US01/14014, dated May 14, 2003.
Bender et al., "Applications for Data Hiding," IBM Systems Journal, vol. 39, Nos. 384, 2000.
Gruhl et al., "Information Hiding to Foil the Casual Counterfeiter," Data Hiding Workshop, Apr. 15, 1998, 15 pages.
O'Ruanaidh et al., "Rotation, Scale and Translation Invariant Digital Image Watermarking," Int. Conf. on Image Proc., Oct. 1997, IEEE, pp. 536-539.
Quisquater et al., "Access Control and Copyright Protection for Images, Conditional Access and Copyright Protection Based on the Use of Trusted Third Parties," 1995, 43 pages.
Sheng et al., "Experiments on Pattern Recognition Using Invariant Fourier-Mellin Descriptors," Journal of Optical Society of America, vol. 3, No. 6, Jun. 1986, pp. 771-776.
U.S. Appl. No. 10/137,124, filed May 1, 2002, Hannign et al.
Solitaire® Electronic Access Control Systems: Access Control with a Magnetic Card (Product Catalog), 59 pages, 2004.
Szepanski, "A Signal Theoretic Method for Creating Forgery-Proof Documents for Automatic Verification", 1979 Carnahan Conference on Crime Countermeasures, University of Kentucky, Lexington, Kentucky, 10 pages, May 16-18, 1979.
Kawaguchi et al., "Principle and Applications of BPCS-Steganography," Proc. SPIE vol. 3528: Multimedia Systems and Applications, Nov. 2-4, 1998, pp. 464-473.
Komatsu et al., "A Proposal on Digital Watermarking in Document Image Communication and Its Application to Realizing a Signature," Electronics and Communications in Japan, Part I, vol., 73, No. 5, 1990, pp. 22-33.
Komatsu et al., "Authentication System Using Concealed Image in Telematics," Memoirs of the School of Science & Engineering, Waseda Univ., No. 52, 1988, pp. 45-60.
Bender et al., "Techniques for Data Hiding," SPIE vol. 2420, Jan. 1995, pp. 164-173.
Zhao, et al., "Embedding Robust Labels into Images for Copyright Protection," Proc. Of the Intern. Congress on Intel. Prop. Rights for Specialized Information, Knowledge and New Technologies, 10 pages, (Vienna, Austria, Aug. 21-25, 1995).
Koch et al., "Copyright Protection for Multimedia Data," 15 pages, Dec. 1994.
Burgett, et al., "A Novel Method for Copyright Labeling Digitized Image Data," 12 pages, Sep. 7, 1994.
Dittmann, et al., "Hologram watermarks for document authentications," Information Tech: Coding and Computing, 2001, Proceedings International Conference on Apr. 2-4, 2001, pp. 60-64.
Jul. 29, 2010 Amendment with RCE; Apr. 29, 2010 Notice of Allowance; all from U.S. Appl. No. 12/401,394.
LockSearch.com Solitaire™ 850L System web page: http://www.locksearch.com//IlcoUnican/ilco_unican_Series_.850L.htm (1999).
DIGIMARC Applications web page: http://www.digimarc.com/tech/applications.asp (printed 2007).
DIGIMARC Steganography & Digital Watermarking web http://www.digimarc.com/tech/steganographcy.asp (printed 2007).
International Preliminary Examination Report for PCT/US01/14014 completed Jan. 13, 2003.
Bender et al., "Applications for Data Hiding," IBM Systems Journal, vol. 39, Nos. 384, 2000, pp. 547-568.
Gruhl et al., "Information Hiding to Foil the Casual Counterfeiter," Data Hiding Workshop, Apr. 15, 1998, 15 pages.
O'Ruanaidh et al., Rotation, Scale and translation Invariant Digital Image Watermarking,: Int. Conf. on Image Proc., Oct. 1997, IEEE, pp. 536-539.
Quisquater et al., "Access Control and Copyright Protection for Images, Conditional Access and Copyright Protection Based on the Use of Trusted Third Parties," 1995, 47 pages.
Sheng et al., "Experiments on Pattern Recognition Using Invariant Fouler-Mellin Descriptors," Journal of Optical Society of America, vol. 3, No. 6, Jun., 1986, pp. 771-776.

* cited by examiner

ACCESS CONTROL SYSTEMS

FIELD OF THE INVENTION

The present invention relates to hidden data systems, and is particularly illustrated with reference to documents employing digital watermarks.

BACKGROUND AND SUMMARY OF THE INVENTION

Digital watermarking technology, a form of steganography, encompasses a great variety of techniques by which plural bits of digital data are hidden in some other object without leaving human-apparent evidence of alteration.

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking techniques can also be applied to traditional physical objects, including blank paper. Such blank media, however, presents certain challenges since there is no image that can serve as the carrier for the watermark signal.

The surface of a paper or other physical object can be textured with a pattern of microindentations to steganographically encode plural-bit information. The texturing is optically discernible, e.g., by a scanner, permitting the digital data to be decoded from scan data corresponding to the paper object.

There are other processes by which blank media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analysis of scan data from the media, however, reveals slight localized changes, permitting the multi-bit watermark payload to be discerned. Such printing can be by ink jet, dry offset, wet offset, xerography, etc.

Other techniques extend the texturing techniques, e.g., by employing an intaglio press to texture the media as part of the printing process (either without ink, or with clear ink).

Printable media—especially for security documents (e.g., banknotes) and identity documents (e.g., passports)—is increasingly fashioned from synthetic materials. Polymeric films, such as are available from UCB Films, PLC of Belgium, are one example. Such films may be clear and require opacification prior to use as substrates for security documents. The opacification can be effected by applying plural layers of ink or other material, e.g., by gravure or offet printing processes. (Suitable inks are available, e.g., from Sicpa Securink Corp. of Springfield, Va.) In addition to obscuring the transparency of the film, the inks applied through the printing process form a layer that is well suited to fine-line printing by traditional intaglio methods. Such an arrangement is more particularly detailed in laid-open PCT publication W098/33758. That application is believed to have a pending US counterpart application, which claims priority to Australian application 4847, filed Jan. 29, 1997.

Digital watermarking systems have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

The watermark components may be located in different spatial or temporal locations in a host signal. In images, for example, different components may be located in different parts of the image. Each component may carry a different message or perform a different function. In audio or video, different components may be located in different time frames of the signal.

The watermark components may be defined, embedded and extracted in different domains. Examples of domains include spatial, temporal and frequency domains. A watermark may be defined in a domain by specifying how it alters the host signal in that domain to effect the encoding of the watermark component. A frequency domain component alters the signal in the frequency domain, while a spatial domain component alters the signal in the spatial domain. Of course, such alterations may have an impact that extends across many transform domains.

In addition, components may be located in different spatial or temporal portions of the host signal, and may carry the same or different messages.

The host signal can vary as well. The host is typically some form of multi-dimensional media signal, such as an image, audio sequence or video sequence. In the digital domain, each of these media types is represented as a multi-dimensional array of discrete samples. For example, a color image has spatial dimensions (e.g., its horizontal and vertical components), and color space dimensions (e.g., YUV or RGB). Some signals, like video, have spatial and temporal dimensions. Depending on the needs of a particular application, the embedder may insert a watermark signal that exists in one or more of these dimensions.

While described here as watermark components, one can also construe the components to be different watermarks. This enables the watermark technology described throughout this document to be used in applications using two or more watermarks. For example, some copy protection applications of the watermark structure may use two or more watermarks, each performing similar or different function. One mark may be more fragile than another, and thus, disappear when the combined signal is corrupted or transformed in some fashion. The presence or lack of a watermark or watermark component conveys information to the detector to initiate or prohibit some action, such as playback, copying or recording of the marked signal.

A watermark system may include an embedder, detector, and reader. The watermark embedder encodes a watermark signal in a host signal to create a combined signal. The detector looks for the watermark signal in a potentially corrupted version of the combined signal, and computes its orientation. Finally, a reader extracts a message in the watermark signal from the combined signal using the orientation to approximate the original state of the combined signal.

In the design of the watermark and its components, developers are faced with several design issues such as: the extent to which the mark is impervious to jamming and manipulation (either intentional or unintentional); the extent of imperceptibility; the quantity of information content; the extent to which the mark facilitates detection and recovery, and the extent to which the information content can be recovered accurately.

For certain applications, such as copy protection or authentication, the watermark should be difficult to tamper with or remove by those seeking to circumvent it. To be robust, the watermark must withstand routine manipulation, such as data compression, copying, linear transformation, flipping, inversion, etc., and intentional manipulation intended to remove the mark or make it undetectable. Some applications require the watermark signal to remain robust through digital to analog conversion (e.g., printing an image or playing music), and analog to digital conversion (e.g., scanning the image or digitally sampling the music). In some cases, it is beneficial for the watermarking technique to withstand repeated watermarking.

A variety of signal processing techniques may be applied to address some or all of these design considerations. One such technique is referred to as spreading. Sometimes categorized as a spread spectrum technique, spreading is a way to distribute a message into a number of components (chips), which together make up the entire message. Spreading makes the mark more impervious to jamming and manipulation, and makes it less perceptible.

Another category of signal processing technique is error correction and detection coding. Error correction coding is useful to reconstruct the message accurately from the watermark signal. Error detection coding enables the decoder to determine when the extracted message has an error.

Another signal processing technique that is useful in watermark coding is called scattering. Scattering is a method of distributing the message or its components among an array of locations in a particular transform domain, such as a spatial domain or a spatial frequency domain. Like spreading, scattering makes the watermark less perceptible and more impervious to manipulation.

Yet another signal processing technique is gain control. Gain control is used to adjust the intensity of the watermark signal. The intensity of the signal impacts a number of aspects of watermark coding, including its perceptibility to the ordinary observer, and the ability to detect the mark and accurately recover the message from it.

Gain control can impact the various functions and components of the watermark differently. Thus, in some cases, it is useful to control the gain while taking into account its impact on the message and orientation functions of the watermark or its components. For example, in a watermark system described below, the embedder calculates a different gain for orientation and message components of an image watermark.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place a watermark and how to control the intensity of the watermark so that chances of accurately recovering the watermark are enhanced, resistance to tampering is increased, and perceptibility of the watermark is reduced. Such perceptual analysis can play an integral role in gain control because it helps indicate how the gain can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

In addition to selecting the appropriate signal processing techniques, the developer is faced with other design considerations. One consideration is the nature and format of the media content. In the case of digital images, for example, the image data is typically represented as an array of image samples. Color images are represented as an array of color vectors in a color space, such as RGB or YUV. The watermark may be embedded in one or more of the color components of an image. In some implementations, the embedder may transform the input image into a target color space, and then proceed with the embedding process in that color space.

A watermark signal can be represented as a checkerboard pattern comprising, e.g., a 96×96 array of elements, where each element is, e.g., 0.012 inch on a side. Each component element can be light or dark, or intermediate grey-scale values may be used to further reduce visibility. Such checkerboards may be tiled together to span the full width and length of the media. Alternatively, patterns other than checkerboards can be used (e.g., weave-like patterns).

In most embodiments, a watermark payload is uniform across the medium. In some applications, however, it may be desirable to encode different payloads in different regions of a medium. Such may be the case, for example, in pre-encoding blank pages for magazine stock. Each sheet (ultimately defining two magazine pages on its front and two on its back) may be arranged in columnar form (e.g., 3 columns per page), with each column bearing a different watermark. Still more complex arrangements, e.g., segregating each column into top, middle, and bottom thirds, can of course be used.

In other arrangements, the same watermark may be encoded in different places (e.g., on different sheets of media), but not by using the same pattern. Instead, different patterns can be used in different places to encode the same watermark payload.

The watermark can convey a payload of arbitrary length, commonly in the 2-256 bit range, and perhaps most commonly between 24 and 72 bits. Error correcting coding, such as convolutional coding or BCH coding, can be employed to transform the base payload (e.g., 50 bits) to a longer data string (e.g., 96-1024 bits), assuring robustness in detection notwithstanding some data corruption (e.g., due to wear and tear of the medium, artifacts from scanning, etc.). The bits of this longer string are mapped, e.g., pseudo-randomly, to define the pattern (e.g., checkerboard).

In accordance with one embodiment of the present invention, watermarking is employed to facilitate e-commerce transactions. More particularly, watermarking is employed to assure that an on-line purchaser of goods has physical custody of the credit card being charged. Without such custody, the credit card issuer will refuse the requested transaction.

According to another embodiment, a method of commerce over the internet between a user and a merchant is provided. The user is in possession of a document including an embedded watermark. The method includes the steps of: i) extracting identifying data from the watermark, and passing the identifying data to a central site; ii) at the central site, identifying a financial institution identifier associated with the document and passing the identifier and a session ticket to the user; iii) contacting the financial institution via the financial institution identifier and passing the session ticket to obtain an authentication ticket; iv) passing the authentication ticket from the user to the merchant to facilitate a transaction; and v) providing the authentication ticket from the merchant to the financial institution.

In still another embodiment, a method of verifying data is provided. The method includes the steps of: i) digitally capturing an image; ii) computing a hash of the captured image; and iii) comparing the hash with a database of hashes, the database of hashes comprising hashes corresponding to previously captured images.

A system for exchanging data is provided according to yet another embodiment. The system includes a user terminal and a central site. The user terminal includes a watermark reader, and a capturing device to capture an image. The central site includes a database of image hashes. The user terminal communicates with the central site. Also, the reader reads a watermark and computes a hash of a captured image and passes the hash to the central site for comparison with the database of image hashes.

According to another embodiment, a method is provided for commerce over a communications system between a user and a merchant. The system includes a central computer, a user computer, a merchant computer and a financial institution computer. The user computer includes a watermark reader. The various computers communicate via a network. The method includes the steps of: i) accessing the merchant computer from the user computer; ii) launching on the user computer the watermark reader to read a document comprising an embedded watermark, the watermark reader extracting identifying data from the watermark; iii) accessing the central computer from the user computer to obtain a URL for the financial institution computer and a ticket, the URL being identified from the extracted identifying data; iv) passing the ticket from the user computer to the financial institution computer to obtain an authorization; v) upon receipt of the authorization, passing the authorization from the user computer to the merchant computer; and vi) passing the authorization from the merchant computer to the financial institution computer.

A computer readable medium having a data structure stored thereon is provided according to another embodiment. The data structure includes a document identifier, a document type identifier; a hash of an image from which the document identifier and document type identifier were extracted from.

The foregoing and other features and advantages of the present invention will be more readily apparent from the following detailed description, which proceeds with reference to the accompanying drawings.

DETAILED DESCRIPTION

Figure 1:
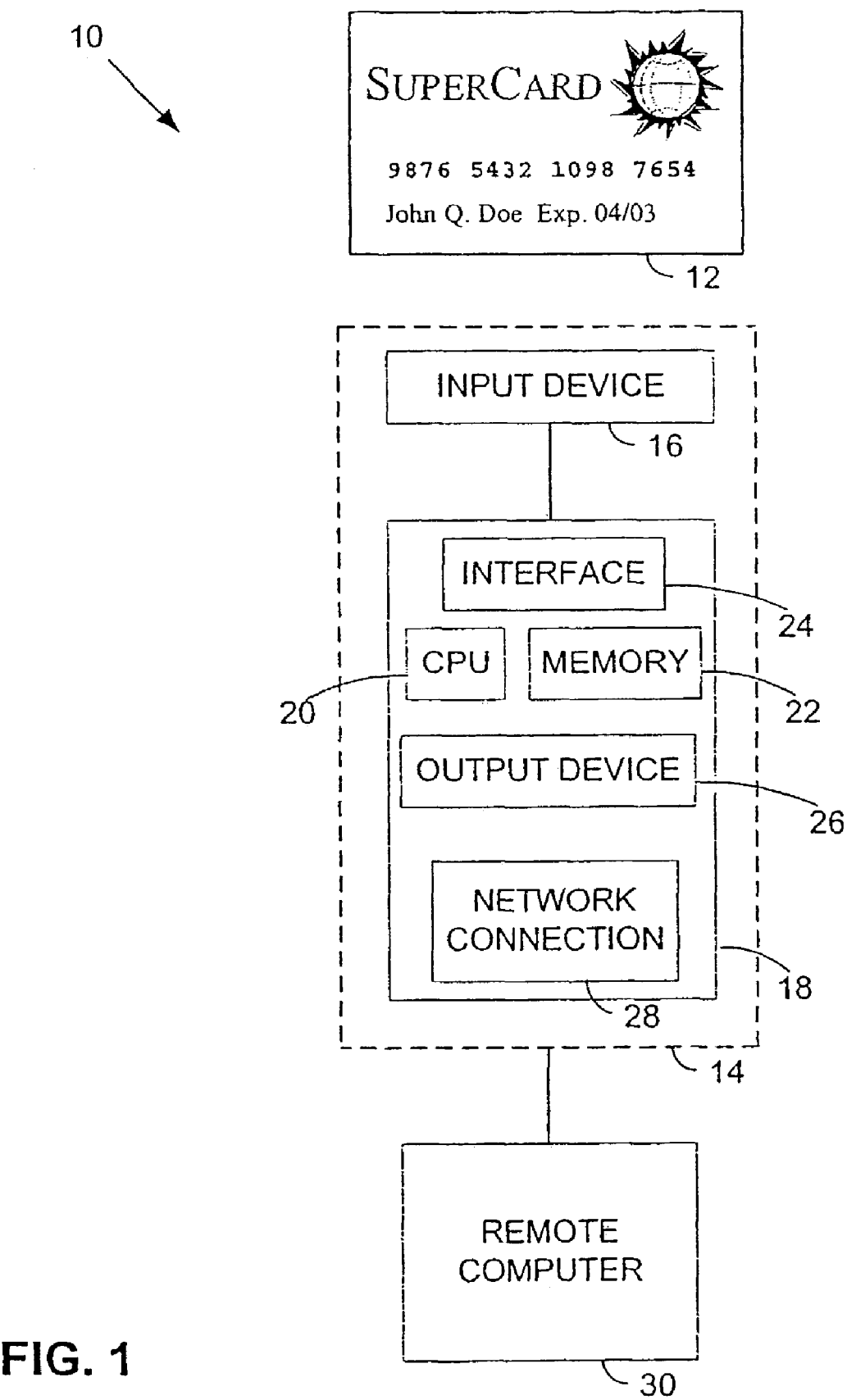
FIG. 1 illustrates a system according to an illustrative embodiment of the present invention.

In accordance with one embodiment 10 of the present invention, a document 12 includes plural-bit digital data steganographically encoded therein (e.g., by digital watermarking). The document can be a photo ID (e.g., a driver's license, student ID, or passport), a value document (e.g., a banknote, stock certificate, or other financial instrument), a credit card, a product manual, bank or credit account card, registration card, or virtually any other type of document.

The encoding of the document can encompass artwork or printing on the document, the document's background, a laminate layer applied to the document, surface texture, etc. If a photograph is present, it too can be encoded. A variety of watermark encoding techniques are detailed in the cited patents and applications; many more are known to artisans in the field.

For expository convenience, this section focuses on photo ID cards and credit cards, but it will be recognized that the invention is not so limited.

In an illustrative embodiment, the card is encoded with a payload of 32 bits. This payload is processed before encoding, using known techniques (e.g., convolutional coding, turbo codes, etc.), to improve its reliable detection in adverse conditions. In other embodiments, a payload larger or smaller than 32 bits can naturally be used (e.g., 8-256 bits).

The encoded card is presented to a reader station 14 for reading. The reader station 14 includes an input device 16 and a processor 18.

The input device 16 can take various forms, including a flatbed scanner, a hand scanner (including an imaging mouse), a video camera, etc.

The processor 18 can be a general purpose or dedicated computer, incorporating a CPU 20, memory 22, an interface 24 to the input device, a display screen or other output device 26, and optionally a network connection 28. The network connection can be used to connect, through an intranet, the internet, or otherwise, to a remote computer 30.

Suitable software programming instructions, stored in memory 22 of processor 18, or in a memory of remote computer 30, can be used to effect various types of functionality for embodiment 10.

One functionality is to increase security for credit card-based e-commerce transactions. Presently, all that is required to purchase goods on-line is a credit card number. Credit card numbers may be obtained illicitly in numerous ways, from dumpster diving to intercepting unencrypted internet transmissions, or by hacking into an online database.

In accordance with this application of the invention, a bank or other entity that issues credit cards may offer a service to its subscribers that requires physical presentment of a credit card before certain purchases (e.g., on-line purchases) can be made. If a subscriber has elected to participate in such a program, the issuer will refuse to authorize payment for any transaction in which the credit card has not been physically presented.

In one such arrangement, a subscriber's home computer, with associated web cam, serves as the reader station 14. On presenting the credit card to the web cam 16, software in the computer decodes a watermark encoded in the credit card artwork, surface texture, etc. Only if this watermark is properly decoded is the card deemed to be present.

The actual verification process can take numerous forms. In one, the credit card number is not passed to the vendor until it is locally verified by reference to the watermark data. In one such arrangement, the card number is provided to the computer in one of various ways (e.g., by typing into a web form presented by internet browser software; by serving from a secure cache, etc.). Before, or after, the computer decodes the watermark data from the physical credit card presented to the web cam. The computer then checks for a predetermined type of correspondence between the credit card number and the watermark data (e.g., the credit card number, processed by a hash function, must yield the watermark payload). Only if the watermark data and credit card number properly correspond is the credit card number transmitted from the browser to the vendor. This approach has, as one of its advantages, that the data exchange protocols between the user, the vendor, and the issuer, needn't be changed.

In another arrangement, both the decoded watermark data and the credit card number are passed to the vendor, and from the vendor to the card issuer. The card issuer can then confirm that the watermark data and credit card number correspond in a predetermined manner, and authorize the transaction if such correspondence is found. This approach has, as one of its advantages, that the correspondence check is not made at the user's computer, thereby making the verification algorithms employed more secure against hacking.

In still other arrangements, the user does not enter the credit card information at the time of the transaction. Instead, the card number may have already been stored at a remote site on the internet, e.g., at a vendor's database. A cookie stored on the user's computer may be checked by the vendor to determine the identity of the consumer, and thereby identify the corresponding credit card number.

To guard against unauthorized charging in this context, the issuer can refuse charge authorization when the card number is forwarded to it by the vendor. With its refusal, the issuer can provide an error code that indicates, to the vendor, that physical custody of the card must be demonstrated by the user before the charge will be authorized. The vendor can then query the user computer for this information. If the user has not already done so, the card can be presented to the web cam, and the decoded watermark data then passed to the vendor, and then to the issuer for confirmation of the necessary correspondence.

The back-and-forth just described can be overcome by storing data in the cookie indicating that physical presentment of that user's credit card is required before any credit card transaction can be approved. Such indicia can be added to the cookie the first time a charge authorization is refused for lack of such presentment. Thereafter, when the vendor detects such indicia in the user cookie, it can query the user for watermark data (e.g., inviting the user to present the credit card to the web cam, if necessary) before passing the transaction data to the issuer.

If this (or other) physical presentment technology becomes sufficiently widespread, standards may evolve by which vendors can discern—from data on the user's computer—whether physical presentment is required for credit card transactions. In such case, individual vendor cookies on a user's machines needn't be updated. Instead, a single datum (a cookie or otherwise)—referred to by all vendors—can be used to flag the need for presentment.

(The reference to "other" physical presentment technology anticipates that alternative arrangements may be employed to confirm user custody of a credit card. These may involve magnetic stripe readers, detection of other physical features, communication with a processor-, memory-, or other circuitry-embedded in a card, etc.)

The foregoing are just exemplary implementations of e-commerce arrangements requiring physical custody of the credit card. It will be recognized that there are a great number of variations on these basic themes. All, however, require physical presentment of the credit card before the credit card charge is approved.

The foregoing is just one application of the detailed technology. There are many others.

Consider, for example, the use of embedded watermark data in a document to allow access to a resource. A card may be used to grant physical access through a normally-locked door. Or a card may be used to logon to a computer network—with directory privileges tied to the data decoded from the card. (Entry of a user's PIN code, or other identity check, may be desirable in certain contexts, e.g., to guard against granting access to a person who has found or stolen someone else's card.)

In some cases, the data encoded in the card fully replicates certain information associated with the card (e.g., the bearer's last name or initials, or OCR printing, or mag stripe data, etc.). Or the encoded data can be related to other information on the card in a known way (e.g., by a hash function based on the bearer's printed name, or the full-text card contents). Or the encoded data can be unrelated to other information on the card.

In many embodiments, the data encoded in the card may serve as an index to a larger repository of associated data stored in a remote database, e.g., on computer 30. Thus, for example, an index datum read from a passport may allow a passport inspector to access a database record corresponding to the encoded data. This record may include a reference photograph of the passport holder, and other personal and issuance data. If the data obtained from the database does not match the text or photograph included on the card, then the card has apparently been altered.

Secure Transaction System

Figure 2:
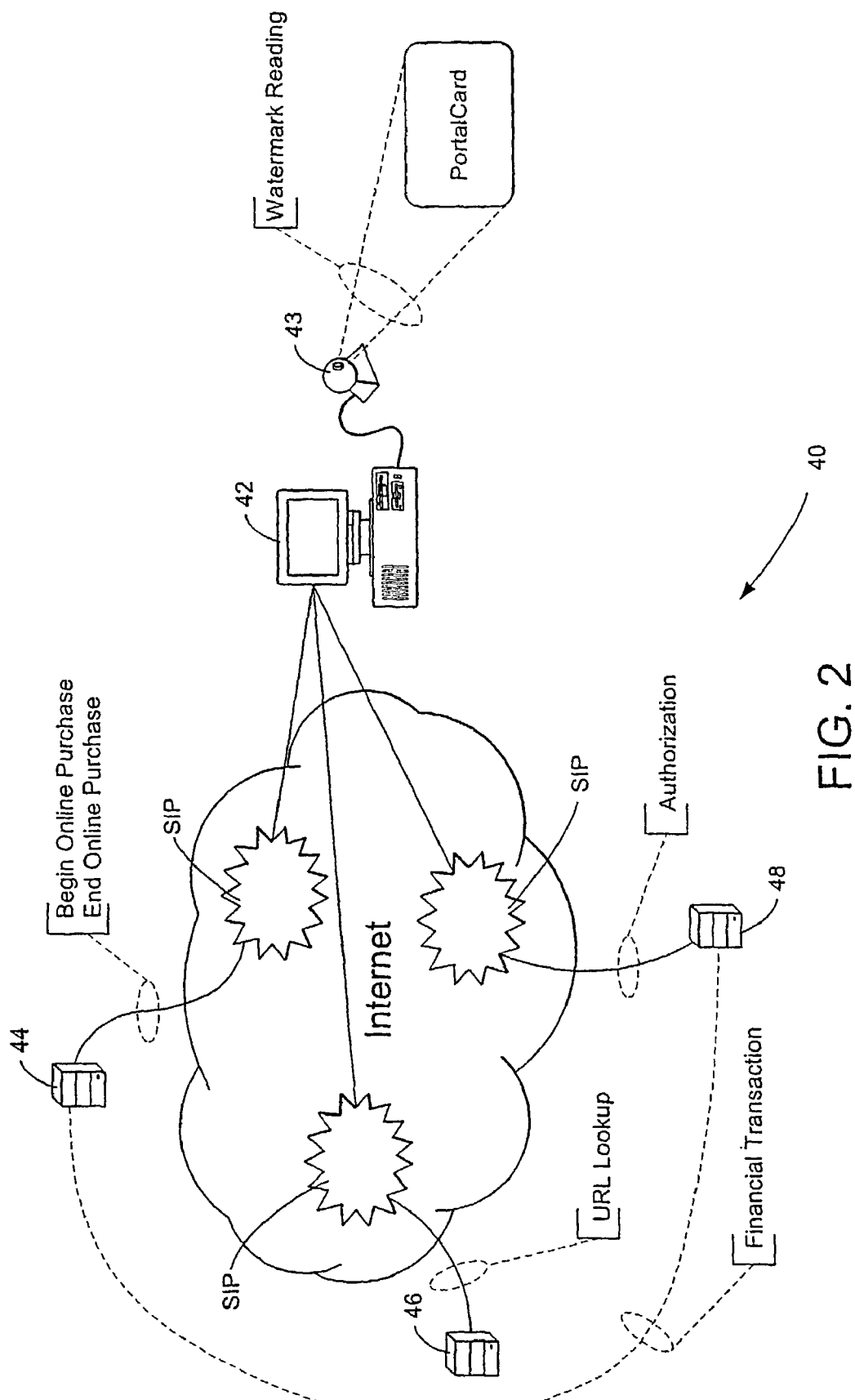
FIG. 2 illustrates a system according to an illustrative embodiment of the present invention.

A secure transaction system is described with reference to FIG. 2. FIG. 2 illustrates system 40, which facilitates a transaction for goods, financial instruments, services, etc. The transaction occurs online (e.g., over the internet). However, the principles described herein are equally applicable to transactions occurring over dedicated networks, wireless networks, intranets, WANs, LANs, etc. The overall system 40 components are described with reference to FIG. 2. Further system operations are described with respect to FIGS. 3*a*-8.

In the present invention, communication between a client and a host (or a plurality of hosts) is facilitated. The client and host may both reside locally, or may communicate over remote channels. Communication between the client and host may occur via internet protocols (e.g., TCP/IP), or other communication techniques. In one embodiment, the client is maintained on a user terminal (or user computer, server, etc.), while the host resides on a central site. In another embodiment, the client and host are incorporated within a local system. In still another embodiment, the host is dispersed throughout various sites. These and other such variations are within the scope of the present invention.

With reference to FIG. 2, system 40 includes a user terminal 42, merchant site 44, central site 46, financial institution site 48, and (optionally) remote terminal 50. The user terminal 42 may include a general purpose or dedicated computer incorporating at least a CPU, memory, interface to an input device (e.g., web cam, digital video camera, scanner, and/or still digital camera, etc.) 43, a display (or other output device), and a network connection. The network connection may be used to connect through an intranet, the internet, or otherwise communicate with sites 44, 46, and/or 48. Of course, the user terminal 42 may alternatively include a portable computing unit, such as a personal financial assistant, PocketPC, PalmPilot, etc., with associated components and/or wireless, cable, phone or other networking access. Suitable client software programming instructions, stored in the user terminal memory, or in a memory of a remote computer, can be used to effect various types of functionality for the user terminal 42.

Merchant site 44, central site 46, and financial site 48 each include a computer or server (or a plurality of interconnected servers). As will be appreciated by those skilled in the art, these computers maintain and execute software, e.g., for hosting (and/or supporting) web pages, communication, database management, etc. These sites 44,46, and 48 also maintain suitable software program instructions to facilitate the system operations described herein. Of course, system 40 may include a plurality of merchant and financial sites, and additional and/or alternative central sites.

Figure 3A:
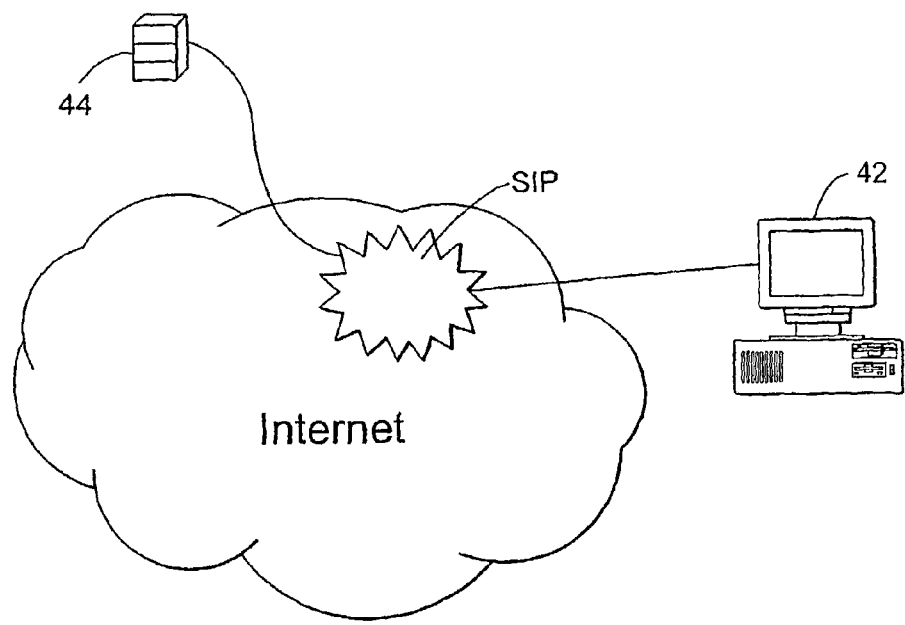
FIGS. 3A through 8 further illustrate the system of FIG. 2.

With reference to FIG. 3a, a user initiates an online purchase by accessing a website or other interface supported by merchant site 44, e.g., with the aid of an interface residing on user terminal 42. The interface may include a dialog box, web browser, application, and/or other communication mechanism. A secure, session-oriented internet protocol ("SIP") connection is preferably created between the merchant site 44 and the user terminal 42. This type of connection helps to prevent unauthorized eavesdropping by a third party.

Figure 3B:
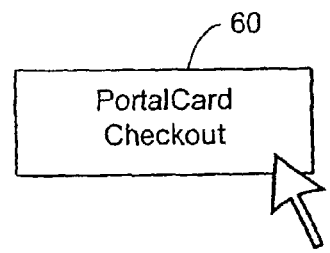

In one embodiment, the user makes a transaction selection via the merchant's website and proceeds to an online checkout location. The checkout location is preferably a graphical user interface (e.g., a dialog box), which allows the user to select at least one secure checkout option 60. Of course, the checkout could be integrated into another application or interface. As shown in FIG. 3b, one secure checkout option 60 is a "PortalCard"™ checkout option. A PortalCard™ may be a digitally watermarked credit card, access token, voucher, check, note, other watermarked document, etc. The documents discussed above are broadly defined so as to include a PortalCard™. (For consistency, the term "document" will be used hereafter instead of PortalCard™). Upon selecting the secure checkout option 60, a watermark decoder (e.g., a browser software plug-in) is launched on the user terminal 42. As an alternatively arrangement, instead of launching the decoder upon selecting the secure checkout option 60, the decoder remains active in the operating background. Of course, the decoder may be integrated into other applications, such as an operating system, software application, independent software module, device, system, etc. Such a decoder detects and reads an embedded watermark (or watermarks) from a signal suspected of containing the watermark. The watermark preferably includes additional data, such as a plural-bit message, payload and/or identification bits, which is extracted by the decoder.

Figure 4:
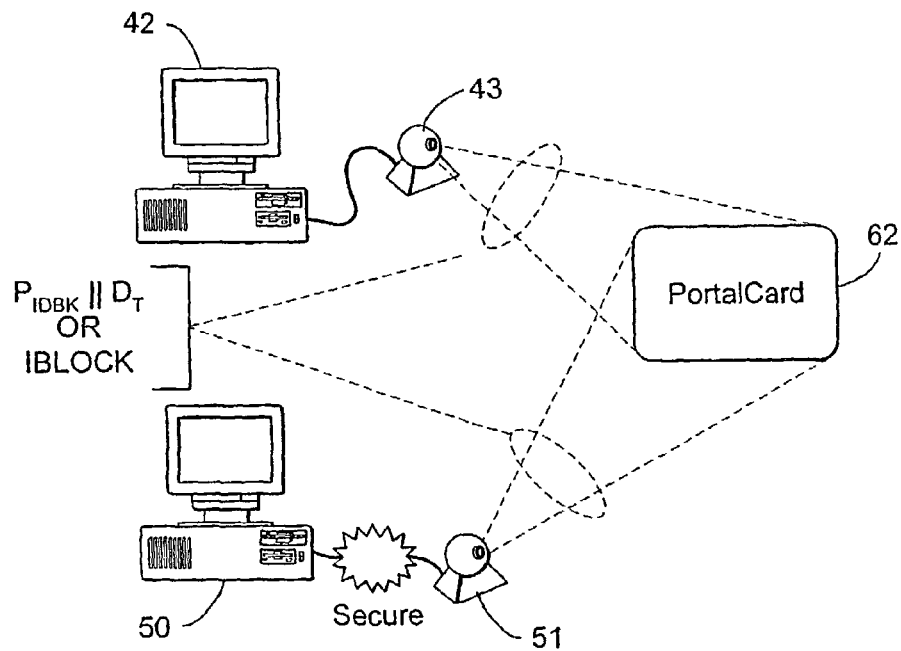

Preferably, the user is prompted to position or to otherwise arrange the document 62 for image capture by input device 43 (FIG. 4). The decoder examines a captured image (or images) and reads the digital watermark to extract the additional data. The additional data may include a document ID ($P_{IDBK}$) and a document type identifier ($D_r$). These identifiers may be concatenated strings or may be segmented within the additional data (or payload). (The symbol || in the drawings represents concatenated data.). Of course, the data could be combined in another manner, such as in segments, packets or blocks. The document ID uniquely identifies the document and may optionally be associated with a user account (e.g., a credit or cash account). The length of the document identifier is preferably selected based on application and/or system requirements. In an illustrative embodiment, the document identifier includes 8-256 bits (e.g., 8, 32, 44, 64, 128, etc. bits). To provide further security, the document ID may be encrypted with a symmetric key ($B_K$) from the document's issuing institution (e.g., a bank). Preferably, only the issuing institution has possession of the symmetric key.

Software executing at user terminal 42 preferably computes a hash of each captured image. This software may be included as part of the watermark decoder, or may be a separate application or module. Each captured image will generally have a unique hash associated with it. Even images of the same document will have unique features respectively associated with them due to environmental changes (e.g., positioning of the document relative to the camera, background changes, orientation, lighting, etc.). Examples of common hashing algorithms include MD2, MD5, MD11, SHA, and SHA1. Of course, these and other hashing algorithms can be effectively used with the present invention. A computed hash is represented by $I_H$ in the figures.

Figure 5:
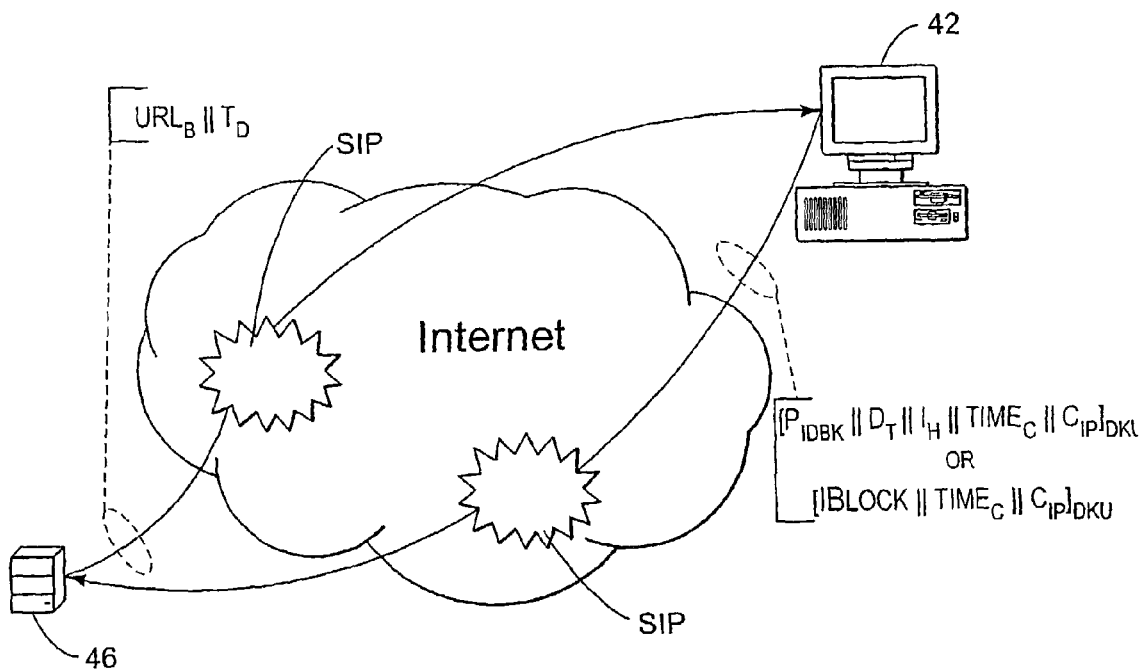

As shown in FIG. 5, the user terminal 42 contacts and establishes a secure communications channel with the central site 46. The user terminal 42 passes a request to the central site 46. The request preferably includes the encrypted document ID ($P_{IDBK}$), document type ($D_r$), unique image hash ($I_H$), the user terminal's IP address ($C_{IP}$), and a timestamp ($TIME_C$) of the request. Of course, the request could include more or less information depending on need and system implementation. Encrypting the request with a central site public key (DKU) provides additional security. In FIG. 5 the encrypted request is represented by:

$$[P_{IDBK}\|D_T\|I_H\|TIME_C\|C_{IP}]_{DKU}$$

The central site 46 has a corresponding private key to facilitate decryption of the request.

The user terminal 42 may obtain a timestamp in various ways. For example, a timestamp may be obtained by online synchronization of user terminal 42 with central site 46. The user terminal 42 may alternatively maintain or gain access to (e.g., via the internet) an atomic clock.

The central site 46 decrypts a request using the corresponding private key. The central site 46 then has access to the request's components, including the encrypted document ID, document type, unique image hash, the user terminal's IP address, and timestamp. As discussed above, the document ID is preferably encrypted with the issuing financial institution's symmetric key, thus preventing the central site 46 from decrypting or otherwise accessing the document ID—providing a further level of security for system 40.

If provided in a request, the hash ($I_H$) is used as an additional security measure. The central site 46 compares the hash against all other hashes received and stored from the user terminal 42.

For even further security, the hash is compared against all stored hashes, or a subset of the stored hashes. A match indicates that the hash was computed from an identical image. Such a match is a near impossibility for a legitimate request when considering background changes, orientation, position variations, etc. A match may suggest that an attack via capture and playback is being carried out. Accordingly, the request is preferably dropped (e.g., is not processed) if a match is found. As an alternative to dropping the request, the central site 46 could query the user for additional verification (e.g., a PIN, password, or instructions to recapture the image).

The timestamp can also be used as an additional security feature. The central site 46 checks whether the timestamp is within an acceptable time window. Preferably, the central site 46 will not process the request if the timestamp indicates that the request was stamped outside of the window. This technique also helps to prevent capture and playback by an unauthorized third party.

The central site 46 identifies corresponding information by using the document type identifier ($D_T$) as an index or reference. For example, the document type identifier is used to index into a database of URLs. These URLs respectively correspond to various financial institutions, which have issued watermarked documents. The central site 46 matches the document type identifier ($D_T$) with a URL (e.g., $URL_B$) corresponding to the document's issuing institution. In this example, the issuing institution is financial institution 48.

The central site 46 provides a session ticket ($T_D$). The session ticket preferably includes the encrypted document ID ($P_{IDBK}$), a timestamp for the return ticket ($TIME_D$) and an IP address for the user terminal 42. The session ticket is preferably encrypted with the financial institution's public key (BKU). Such encryption helps to prevent a malicious or unauthorized user of the user terminal 42 from interpreting and modifying the session ticket ($T_D$). The user's IP address may be verified at a later stage of the transaction process. Such IP address verification helps prevent misdirection of the session receipt. The session ticket and the URL of the financial institution ($URL_B$) are returned to the user terminal 42 (e.g., $URL_B \| T_D$ in FIG. 5).

Figure 6:
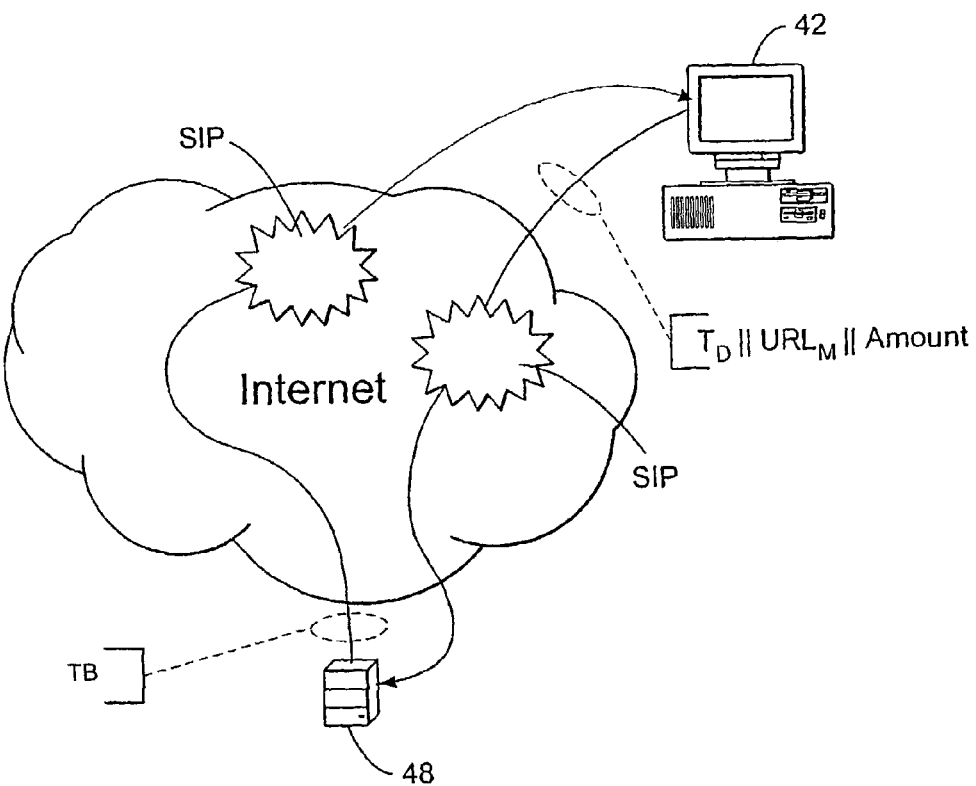

With reference to FIG. 6, upon receipt of the $URL_B$ and session ticket ($T_D$) the user's client (e.g., client software residing at user terminal 42) contacts financial institution 42 via the $URL_B$. The client (via user terminal 42) passes the session ticket ($T_D$), merchant site URL (e.g., $URL_M$), and the transaction details to financial institution 48. The transaction details preferably include the amount of the online purchase. The connection with the financial institution 48 is preferably secure (e.g., through a secure session internet protocol connection).

The financial institution 48 decrypts the session ticket with its corresponding private key. The user terminal IP address and return timestamp may be verified to determine any misdirection or playback attack. The financial institution 48 now has access to the encrypted document ID, which it decrypts with its symmetric key. The decrypted document ID is used to index or otherwise locate the user's account. In some cases, the document ID may include the user's account number. The user's corresponding account may be queried to determine if the user has sufficient funds (or credit) for the transaction amount. The financial institution may optionally prompt the user terminal 42 for a second form of identification (e.g., a PIN or password) before authoring the transaction. In an alternative embodiment, the PIN (or other verification) is collected and included in the session ticket, thus providing further efficiency for the system.

The financial institution 48 provides an authorization ticket ($T_B$) to the user terminal 42 upon authorization of a transaction (FIG. 6). An authorization ticket preferably includes the document ID, a timestamp for the ticket, the user terminal's IP address, the merchant's URL, and the amount of the transaction. The authorizing ticket is used to help facilitate payment to the merchant. The authorization ticket is preferably encrypted using a symmetric key ($B_K$) associated with the financial institution. Since only the financial institution 48 knows the symmetrical key, encrypting the authorization ticket as such prevents a malicious user or merchant from interpreting or modifying the authorization ticket ($I_B$).

Figure 7:
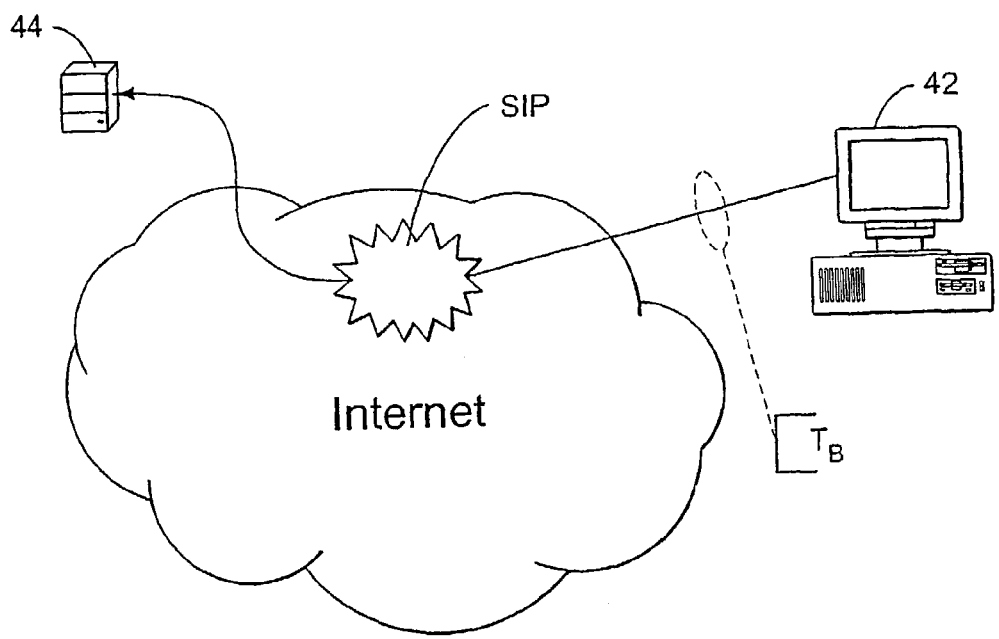

The user's client residing at terminal 42 passes the bank authorization ticket ($T_B$) to the merchant site 44, as shown in FIG. 7. The client may also pass additional information such as shipping and handling information. This information is optionally stored locally at the user terminal 42, and submitted automatically to the merchant site 44 with the authorization ticket. The user may also be presented with a dialog screen, which allows entry and/or changes to shipping and handling requirements. Since the bank authorization ticket is encrypted with a symmetrical key, the authorization ticket cannot be meaningfully decrypted or altered by the user.

Figure 8:
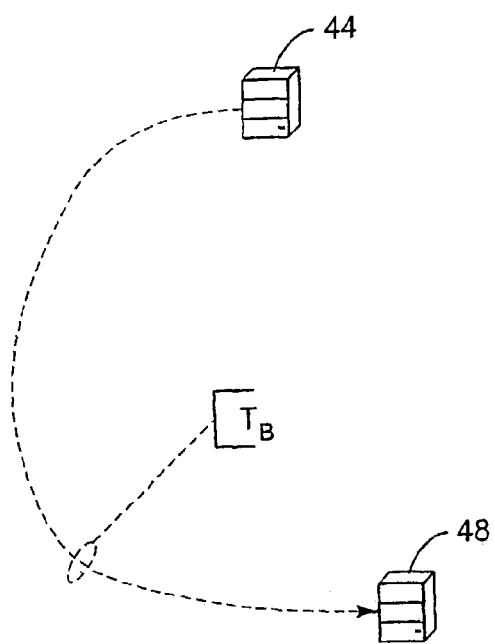

As shown in FIG. 8, the merchant site 44 verifies the authorization of the credit/payment by passing the authorization ticket (TB) back to the financial institution 48, along with any other details of the transaction (e.g., merchant ID, user information, contract terms, etc.). The merchant site 44 may contact the financial institution 48 via the internet, or through secure, dedicated channels. The authorization ticket cannot be meaningfully decrypted or altered by the merchant. Accordingly, the financial institution can be assured that the ticket contains the original amount and merchant URL that was reported by the user terminal 42. Also, the user is protected since her account details are never exposed to the merchant. Existence of the authorization ticket signals to the financial institution 48 that a "PortalCard" purchase option was used for the transaction. After decrypting the authorization ticket, these details can be used to verify the transaction details. The ticket timestamp can also be used to prevent duplicate transaction submissions. The financial institution 48 confirms validity of the authorization ticket to the merchant site 44. Optionally, the user then receives a confirmation from the Merchant site 44 that the transaction has been successfully completed. The following discussion is presented to summarize some of the features and functionality of system 40. A user begins an online purchase by accessing a merchant website. A decoder, residing on the user's site, reads (or identifies) a watermarked document. The client residing on a user terminal contacts a central site to obtain a URL for a financial institution's authentication server and to get a session ticket. The client contacts the financial institution's server via the URL and passes the session ticket to the bank to obtain an authorization ticket. The client then passes the authorization ticket to the merchant. The merchant includes the authorization ticket in its financial transaction with the financial institution. Preferably, these steps are seamlessly carried out by the user's computer (e.g., the client software), in conjunction with the merchant website, central site, and financial institution site. System 40 offers many advantages. For example, system 40 provides a secure transaction system for online purchases via layers of message encryption and obtaining secure communication channels. According to one embodiment, a merchant is prevented from accessing user credit information (e.g., account or document ID). System 40 also prevents an unscrupulous user from changing price or transaction details, since the authorization ticket is securely encrypted. The above-described hash matching techniques also provide a unique feature of the present invention. The hash matching helps to prevent capture and playback attacks. These and other advantages are apparent from the detailed description.

Alternative Embodiments

There are many variations and alternative arrangements of system 40. Of course, such modifications fall within the scope of the present invention. For example, additional security measures may be taken in event that a user accesses the transaction system (e.g., merchant site 44, central site 46 and financial institution 48, etc.) through remote site 50 (FIG. 4). For example, input device 51 and its link to a remote site 50 may include an encrypted link (or links), using a key negotiated by camera 51 and software resident on the remote site 50. Secure encryption techniques may also be used for a link between remote site 52 and the system.

In another alternative arrangement, a watermark is not decoded by the user terminal 42 (e.g., a decoder operating on user terminal 42). Instead, the decoder determines whether a watermark is present within a captured image. If a watermark is present, a block of image data (e.g., all or some of the captured image) is passed as a request to central site 46. Preferably, the request includes the image data ($IB_{LOCK}$), a timestamp ($TIME_C$), and the user terminal's IP address ($C_{IP}$). The request may be encrypted with a central site public key ($_{DKU}$) for additional security. An encrypted request is represented in FIG. 5 as $[IBLOCK \| TIME_C \| C_{IP}]_{DKU}$. The central site 46 decrypts the request and then extracts the watermark from the image data. Additional data (e.g., the encrypted document ID and document type identifier) can then be extracted from the watermark. This alternative arrangement shifts a majority of the decoding from the user terminal 42 to the central site 46. Shifting the decoding away from the user terminal 42 may provide an advantage, particularly if a third party could intercept the data stream from the user terminal 42 to the central site 46. In this alternative arrangement, the intercepted stream will not be in a decoded form—which significantly reduces the amount of revealed data. Also, since the decoding processes (or a majority of the processes) are maintained securely by central site 46, there is less of the decoding algorithms (and/or software code) to attack at the user terminal 42.

Upon receiving the image block, the central site 46 may optionally record the image data or a hash of the image data. The hash is then used to match against other hashes corresponding to the user terminal 42, as discussed above.

A premise of these ideas also finds application beyond online purchases. One application is to verify permissions, add security to logins, and/or to facilitate account access (e.g., a bank account, credit account, access to restricted or hidden network layers, etc.). For example, a user establishes a link with the central site 46 via an embedded object to obtain a corresponding permission authenticator URL. The central site 46 generates a session ticket with appropriate data (identifiers, IP addresses, etc.). The user terminal 42 passes the session ticket to the authenticator (e.g., bank, corporation, etc.) for authorization. The authenticator authorizes access by providing an authorization ticket or other enabling data (corresponding password, new URL, etc.). Such modifications are within the scope of the present invention.

Additional Security Features

To deter use of precision photocopy apparatuses to reproduce document faces (while retaining the associated watermark), the face of the document can be provided with a reflective layer, e.g., in the form of an overlay or varnish. In the bright illumination of a photocopier, such layer mirrors the light back onto the photodetectors, preventing them from accurately reproducing the watermark pattern. In contrast, when presented to a web cam or other such imaging device, no bright illumination is typically present, so the photosensors are not overwhelmed and the document can be used for its intended authentication purpose.

Secure Transmission of Watermark Data

Figure 9:
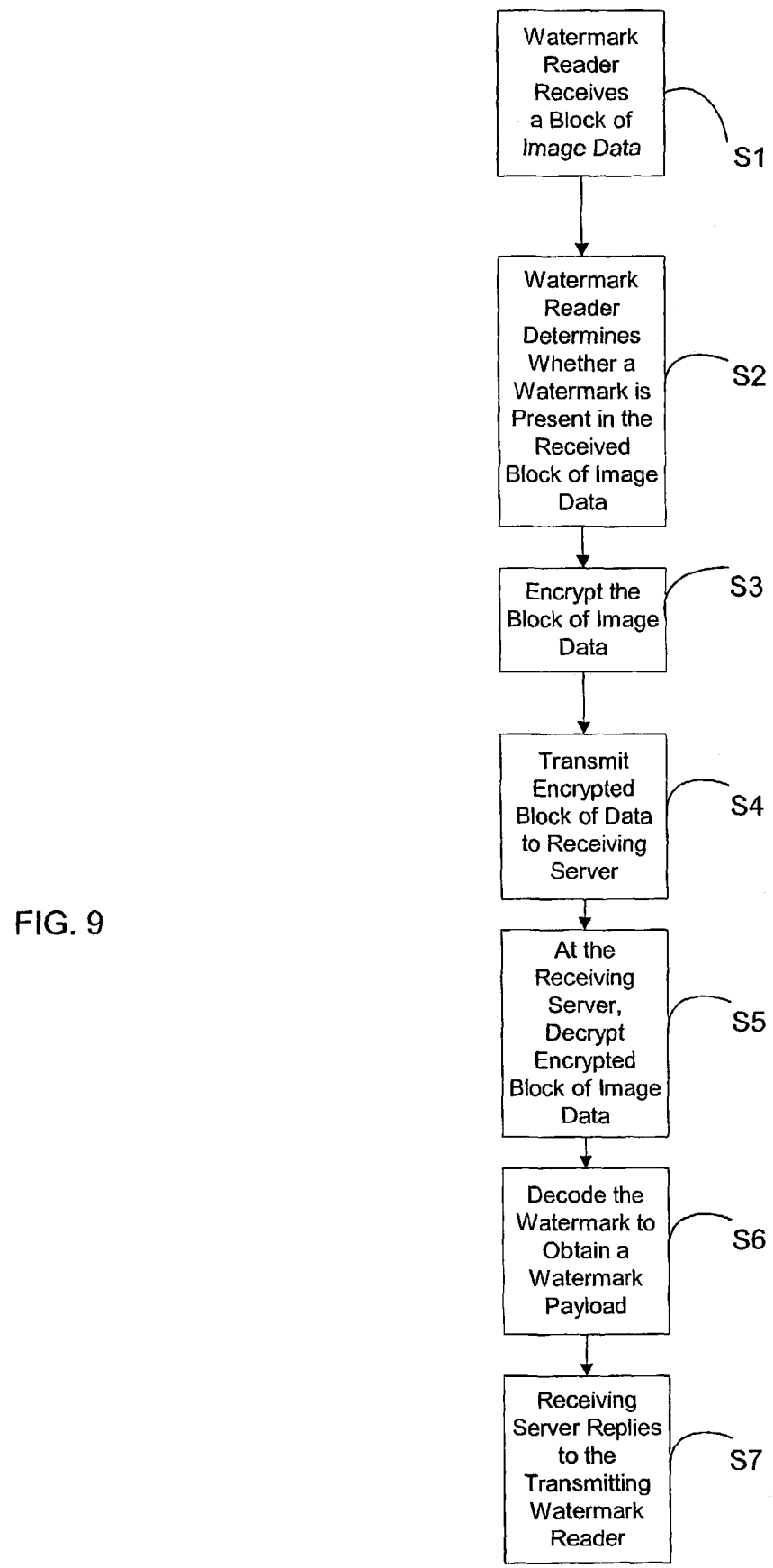
FIG. 9 is flow diagram representing a secure method for transferring watermarked data

With reference to FIG. 9, a secure method for transferring digitally watermarked data is disclosed. A digital watermark reader receives data (e.g., a captured image, a video frame, etc.) in step S1. In step S2, the reader determines whether a watermark is present in a captured image block area. For example, the reader may extract a watermark payload from image data, such as from luminance values, in an image block area (e.g., 8×8, 64×64, 128×128 pixel block, etc.). Alternatively, the reader may sample the area to determine whether a watermark signal is present in the block area. As an optional step, the watermark reader compresses the block of image data (e.g., via a lossy compression technique). Preferably, as indicated in step S3, the watermark reader encrypts the image block using a public key. (Of course, other encryption schemes, e.g., symmetrical, asymmetrical, can be employed to ensure that the image block is securely encrypted, and that a receiving server is able to decrypt the image block.). The image block can be optionally time-stamped to help prevent copy attacks, and to help track or identify the block.

In step S4, the encrypted image block is transmitted to a receiving server, e.g., server 46 in FIG. 2. The receiving server decrypts the image block in step S5. (Preferably, only the receiving server has possession of a corresponding private key, which will decrypt the encrypted image block. In another embodiment, the watermark reader and the receiving server have systematical keys. In still another embodiment, the receiving server is issued a public key corresponding to the watermark reader's private key.). Optionally, if the image block was time stamped, the timestamp is checked to determine if the transmitted image block is stale. Staleness can be determined by comparing the timestamp with a predetermined window (e.g., 10 minutes, 1 hour, etc.). A stale timestamp may indicate a copy attack. Accordingly, a stale image block is preferably discarded.

If the image block is compressed, it is uncompressed by the receiving server. Otherwise, a watermark reader associated with the receiving server reads (e.g., extracts and decodes) the watermark payload in the image block, as indicated in step S6. The receiving server replies, as warranted, to the transmitting watermark reader in step S7. For example, the receiving server may transmit a URL or IP address associated with the decoded watermark payload. The receiving server may alternatively provide data, which is associated with the decoded watermark payload.

Accordingly, digitally watermarked data may be transmitted securely. In fact, since digital watermark data (e.g., payload data) is not transmitted in an undecoded form, e.g., since an image data block (e.g., a block of luminance values) embedded with a digital watermark is transmitted instead, there is less evident information to attack. (Indeed, in another embodiment, the image data block is not encrypted.).

Trial Access Service

In another embodiment, a digitally watermarked document, such as a PortalCard, provides an authorization for a trial service or limited-time access to an online service or website. A document is embedded with a unique identifier (or account number) in the form of a digital watermark. The identifier is associated with an account or temporary access having a limited lifespan (e.g., 30 minutes, 4 hours, etc.). Alternatively, the identifier provides a one-time access to the account.

In a preferred embodiment, a database manages the identifiers, and tracks access and amount of time remaining, etc. In another embodiment, an account is discontinued once a one-time access has been made. In still another embodiment, a timer records account access, and an account is terminated upon the expiration of an allotted amount of time.

Since a corresponding account's lifespan is limited, there is a disincentive for "loaning" the watermarked document for account access. Duplicating an access card does not help a user. In fact, duplicating a card hurts a user since she is giving away limited minutes based on the identifier.

Of course, instead of accessing an online account or website with a limited access card (e.g., a digitally watermarked card), the card can be used for one time (or limited time) memberships at commercial stores, retailers, grocery stores, etc. In this embodiment, a watermark reader is placed at a store entrance or checkout location. The card is presented to the reader, which determines authorization. In particular, the watermark reader extracts an identifier from a payload, and interrogates a database with the identifier. The database may be local or may be remotely accessed, e.g., via the internet or other network. The database returns an authorization signal, such as a code, or permission. The database is updated to reflect activity, such as a use or expiration of time.

Watermark-based Combination Lock

A digitally watermarked document can be used to unlock or access a secure location, such as a security system, data file, network, computer, ATM account, bank or credit card account, electronic lock, physical location, etc. Generally referred to as a combination lock, a watermark-based security system provides enhanced security and an alternative security approach.

Watermark Orientation Component and a Detection Process

A watermark may include a plurality of components. For example, one component may carry a message (or payload), while another component may serve to identify the orientation of the message in a combined signal. The orientation component may provide information such as rotation, scale and translation of the watermark message. Typically, a watermark detector looks for a watermark signal in a potentially distorted version (e.g., skewed or disoriented with respect to an original orientation) of the combined watermark signal, and computes its orientation.

Figure 10:
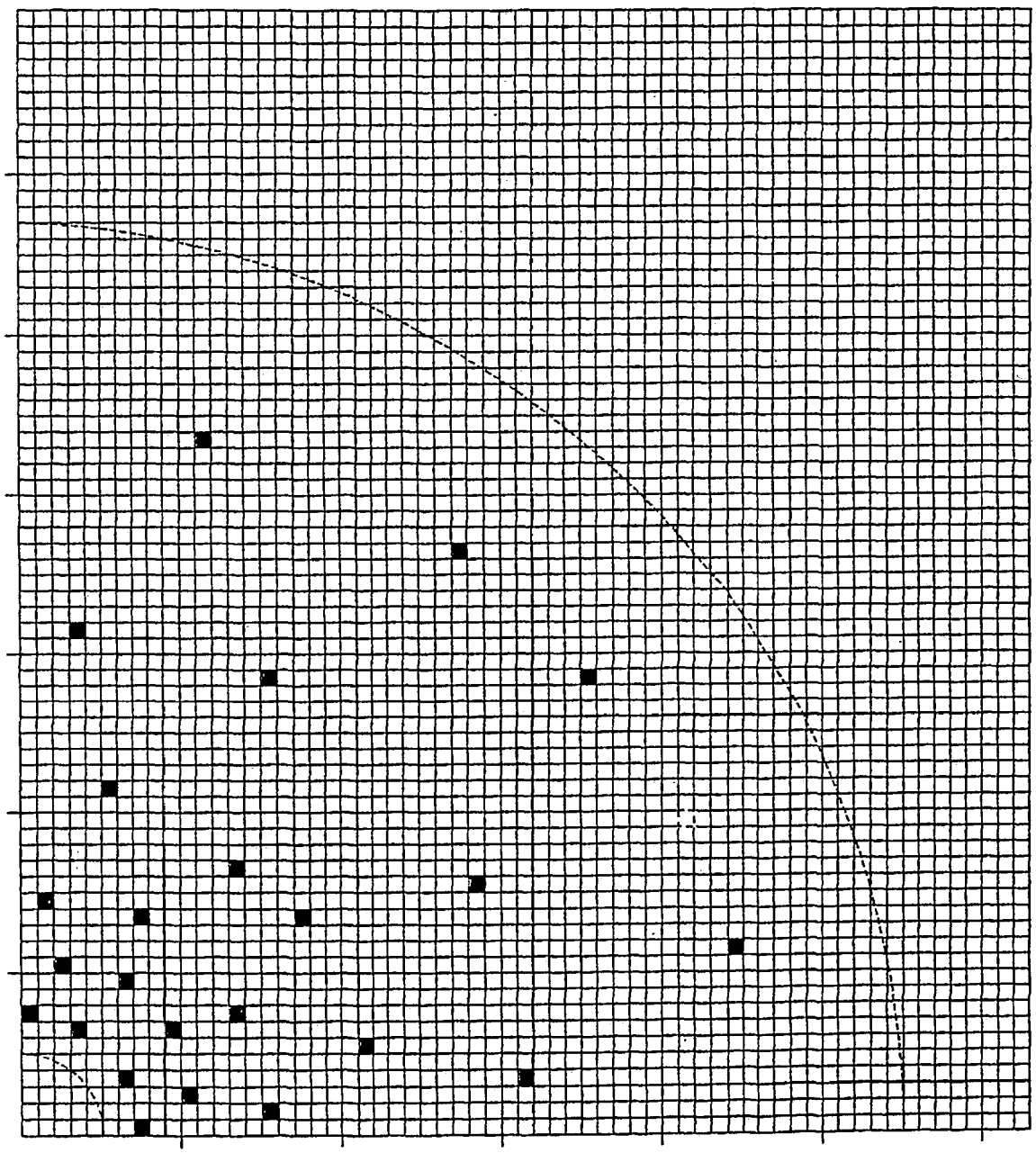
FIG. 10 is a spatial frequency plot illustrating one quadrant of an orientation component.

FIG. 10 is a spatial frequency plot illustrating one quadrant of an orientation component. The points in the plot represent impulse functions indicating signal content of the detection watermark signal. The pattern of impulse functions for the illustrated quadrant can be replicated in all four quadrants. (Part of the replication is produced by the definition of the DCT due to conjugate symmetry properties.). There are a number of properties of the detection pattern that impact its effectiveness for a particular application. The selection of these properties is highly dependent on the application. One property is the extent to which the pattern is symmetric about one or more axes. For example, if the orientation pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in an image, and aids in extracting a rotation angle. However, in the case of an octally symmetric pattern, the detector may include an additional step of testing which of the four quadrants the rotation angle falls into.

Figure 11:
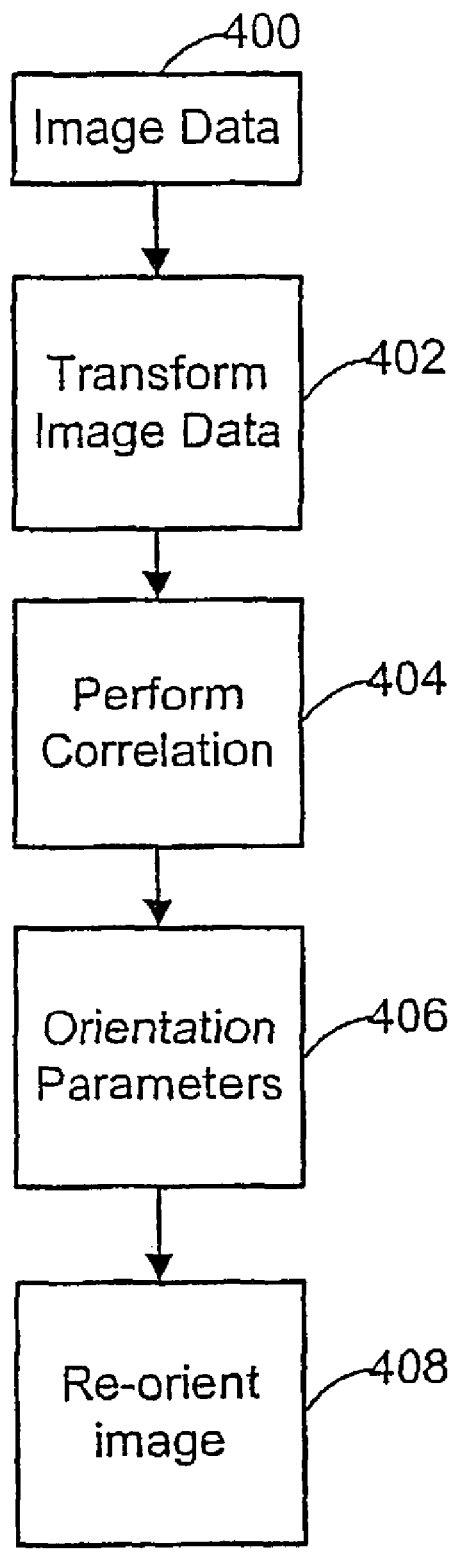
FIG. 11 is a flow diagram illustrating an overview of a watermark detection process.

FIG. 11 is a flow diagram illustrating an overview of a watermark detection process. This process analyzes image data 400 to search for an orientation pattern of a watermark in an image suspected of containing the watermark (the target image). First, the detector transforms the image data to another domain 402, namely the spatial frequency domain, and then performs a series of correlation or other detection operations 404. The correlation operations match the orientation pattern with the target image data to detect the presence of the watermark and its orientation parameters 406 (e.g., translation, scale, rotation, and differential scale relative to its original orientation). Finally, it can re-orient the image data based on one or more of the orientation parameters 408.

Figure 12:
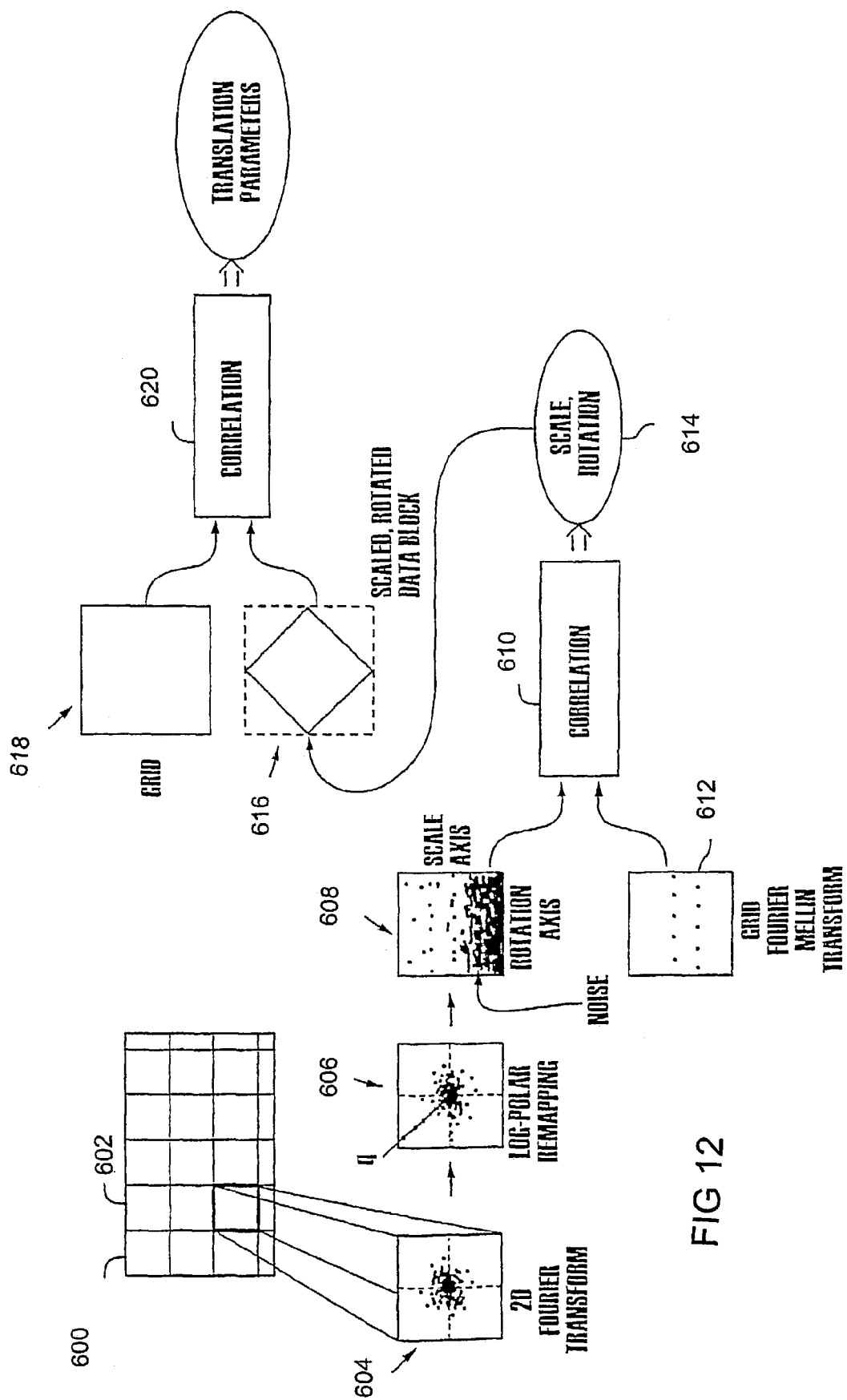
FIG. 12 is a diagram depicting an example of another watermark detection process.

FIG. 12 is a diagram depicting an example of another watermark detection process. The detector segments the target image into blocks (e.g., 600, 602) and then performs a 2-dimensional Fast Fourier transform (2D FFT) on several blocks. This process yields 2D transforms of the magnitudes of the image contents of the blocks in the spatial frequency domain as depicted in the plot 604 shown in FIG. 12.

Next, the detector process performs a log polar remapping of each transformed block. The detector may add some of the blocks together to increase the watermark signal to noise ratio. The type of remapping in this implementation is referred to as a Fourier Mellin transform. The Fourier Mellin transform is a geometric transform that warps the image data from a frequency domain to a log polar coordinate system. (A Fourier Mellin transform is one of many remapping transforms that can be used with the present invention.). As depicted in the plot 606 shown in FIG. 12, this transform sweeps through the transformed image data along a line at angle θ, mapping the data to a log polar coordinate system shown in the next plot 608. The log polar coordinate system has a rotation axis, representing the angle θ, and a scale axis. Inspecting the transformed data at this stage, one can see the orientation pattern of the watermark begin to be distinguishable from the noise component (i.e., the image signal).

Next, the detector performs a correlation 610 between the transformed image block and the transformed orientation pattern 612. At a high level, the correlation process slides the orientation pattern over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. These candidates may be subjected to one or more additional correlation stages to select the one that provides the best match.

There are a variety of ways to implement the correlation process. Any number of generalized matching filters may be implemented for this purpose. One such filter performs an FFT on the target and the orientation pattern, and multiplies the resulting arrays together to yield a multiplied FFT. Finally, it performs an inverse FFT on the multiplied FFT to return the data into its original log-polar domain. The position or positions within this resulting array with the highest magnitude represent the candidates with the highest correlation.

When there are several viable candidates, the detector can select a set of the top candidates and apply an additional correlation stage. Each candidate has a corresponding rotation and scale parameter. The correlation stage rotates and scales the FFT of the orientation pattern and performs a matching operation with the rotated and scaled pattern on the FFT of the target image. The matching operation multiplies the values of the transformed pattern with sample values at corresponding positions in the target image and accumulates the result to yield a measure of the correlation. The detector repeats this process for each of the candidates and picks the one with the highest measure of correlation. As shown in FIG.

12, the rotation and scale parameters (614) of the selected candidate are then used to find additional parameters that describe the orientation of the watermark in the target image. This orientation can be used to determine a rotation of a watermarked document, with respect to an original or predetermined rotation.

The detector applies the scale and rotation to the target data block 616 and then performs another correlation process between the orientation pattern 618 and the scaled and rotated data block 616. The correlation process 620 is a generalized matching filter operation. It provides a measure of correlation for an array of positions that each has an associated translation parameter (e.g., an x, y position). Again, the detector may repeat the process of identifying promising candidates (i.e. those that reflect better correlation relative to others) and using those in an additional search for a parameter or set of orientation parameters that provide a better measure of correlation. The translation property may be used to help determine which quadrant a rotation angle falls within.

At this point, the detector has recovered the following orientation parameters: rotation, scale and translation. For many applications, these parameters may be sufficient to enable accurate reading of the watermark. In the read operation, the reader applies the orientation parameters to re-orient the target image and then proceeds to extract the watermark signal.

There are many alternative ways to determine the rotation, scale, and translation parameters to be used by the present invention. Indeed, any of these alternative methods for determining a rotation signal (or orientation component) can be suitably interchanged with the present invention. For example, rotation can be estimated and then refined until an acceptable estimate is determined. Or rotation can be determined based sampling predetermined patterns. Still another embodiment analyzes an orientation signal in a transformed domain. As another example, instead of using an independent orientation signal, rotation can be recovered from printed positioning marks (or lines, or cross marks) themselves. Of course, artisans know other alternative methods for determining orientation.

Watermark-based Combination lock

Figure 13A:
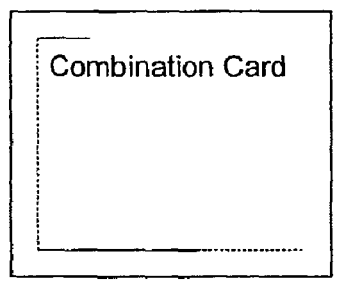
FIGS. 13*a*-13*d* are figures illustrating various orientations of a combination card.
Figure 13B:
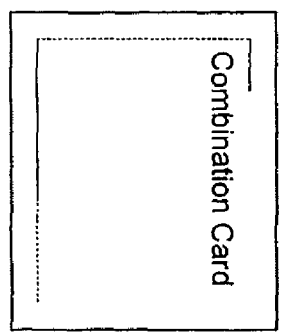
Figure 13C:
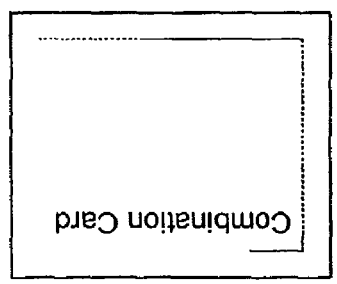
Figure 13D:
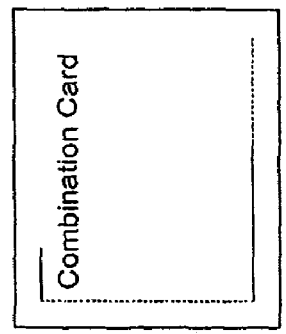

A watermark-based combination lock is now described with reference to FIGS. 13a-13d. A document (hereinafter referred to as a "combination card") is embedded with an orientation component and a message (or payload) component. Preferably, the orientation component conveys a base orientation of the document. (For example, the orientation signal may convey the orientation of the message component. In this case, the message component is preferably aligned to correspond with an orientation of the document, such as up or down, horizontal or vertical, etc. Alternatively, the orientation component may be aligned to represent a directional orientation of the combination card.). In the FIG. 13 example, the orientation component conveys a base orientation. Rotation angles are calculated from this base orientation. In FIG. 13a, the base orientation corresponds with a rotation angle of 0 degrees. Rotating the combination card clockwise to the position shown in FIG. 13b corresponds with a 90-degree rotation angle. Continuing to rotate the combination card to the FIG. 13c position corresponds with a rotation angle of 180 degrees. Similarly, the position shown in FIG. 13d corresponds with a 270-degree rotation angle. (Of course, the card can be positioned at other angles within a 360-degree circle, or a subset of the 360-degree circle.).

The watermark-based combination lock analyzes a series (or combination) of card positions/orientations. A user presents the combination card to an input device, e.g., a digital camera, optical or image sensor, web cam, etc., in communication with a compliant watermark reader. Of course, the compliant watermark reader may be a general-purpose computer programmed with watermark reading software, a network server with like software, a handheld-watermark reading device, a combination of hardware computing components and/or software, etc.

There are many ways to configure an unlocking mechanism for a watermark-based combination lock. In one embodiment, the message component of a watermark includes a unique identifier. The unique identifier may identify an account, an individual, a group, URL or IP address, and/or a database, etc. A card combination, e.g., in degrees, 45-0-270-180, is associated with each unique identifier. Such an association can be maintained by a central server (e.g., server 46 in FIG. 2), a local device (e.g., a security system, a home or office system, a general purpose computer, a handheld computing device, a network server, etc.), and/or an online website. Database management software can be used to help maintain the association between the unique identifier and the card combination.

On an initial read, a watermark reader decodes the message component, which reveals the unique identifier (e.g., account "101"). A database (or data record) is consulted to determine a corresponding combination (e.g., 45-0-270-180 degrees) for account 101. A series of card positions, e.g., as presented by a combination card user, is then compared to the combination (e.g., 45-0-270-180) associated with the unique identifier (e.g., account 101). If the combination of entered positions matches the stored combination, the combination lock is unlocked and a user gains access to the system, account, computer, file, location, office, ATMaccessed account, building, website, etc. Here, the combination is used as a passcode, password, or PIN to gain access to the system.

(In one embodiment, the watermark detector determines a rotation angle associated with the first read, e.g., the read to determine the embedded unique identifier. This first rotation angle is used as the first position (or "tumble") in the combination. In another embodiment, a rotation angle from a subsequent read is used as the first tumble in a combination.).

Another embodiment does not encode a unique identifier in a combination card. Rather, in this embodiment, the combination card directly corresponds with a combination lock. A group of users can be issued cards embedded with watermarks having the same orientation components. The group can each have the same combination or the system will accept several different combinations. In still another embodiment, an account, personal identifier, etc., is determined from other means, instead of decoding an embedded identifier. For example, a user may access a system, security point or website, and enter an account number or identifier, and then present a combination card (in a plurality of positions) to unlock the system. The same technique can be used with a security system or home system.

In a preferred embodiment, a combination lock is configured to provide feedback. For example, after positioning a combination card for image capture, the compliant watermark detector (or a device in communication with the detector) provides an audible or visual signal, indicating that the user may reposition the card to a next combination location. (From a system's perspective, the compliant watermark reader may pause its watermark reading functionality for a predetermined time (e.g., 2-15 seconds to allow repositioning) after producing the audible or visual signal. Alternatively, the compliant watermark detector may monitor the rotational direction of the card, and then determine a rotation angle when the rotation angle settles or stops changing, or after a predetermined time.). The feedback signal is provided after each combination position to help the user move to the next position.

Figure 14:
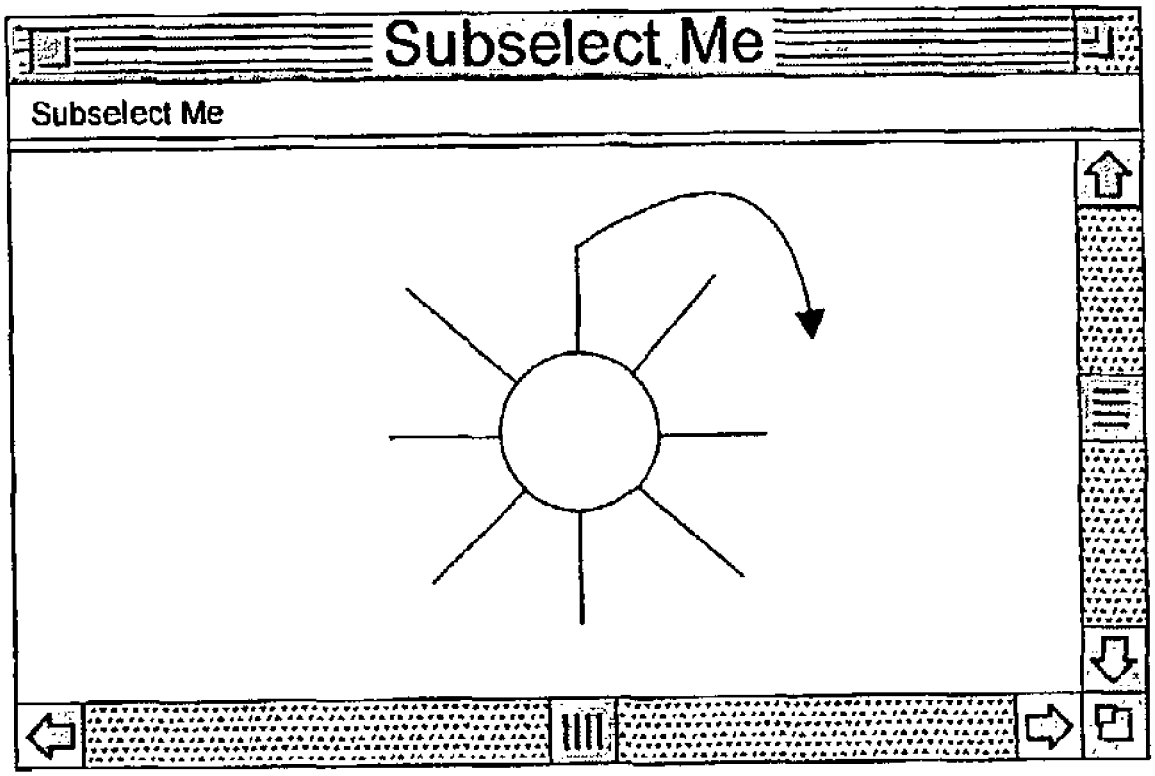
FIG. 14 illustrates a graphical image of a combination lock dial.

In another embodiment, a visual form of feedback is provided. To illustrate, a displayed user interface (GUI) provides a graphical image of a combination lock or dial via a computer display (FIG. 14). A complaint watermark reader interprets a rotation angle of a combination card. The rotation angle is tracked, e.g., as the card rotates its position. The rotation angle is used to control the movement of the graphical, combination lock dial. For example, as a combination card moves clockwise, from 0 to 45 degrees, an indicator (e.g., an arrow marker) on the graphical combination lock dial respectively moves clockwise from 0 to 45 degrees. In this manner, a user is provided with accurate, and efficient feedback as she positions the combination card. (From a system perspective, the rotation angle can be determined as discussed above. The received rotation angle is correlated with the positioning of the graphical combination dial, and graphical feedback is generated for display.).

In another alternative embodiment, a compliant watermark detector monitors (or tracks) changes in rotation angle direction. For example, positions corresponding to directional changes (e.g., right, left, then right again) are used as the various combination lock tumbles. For example, consider a user who rotates a card clockwise from a 0-angle to a 180-degree angle, then counter-clockwise rotates the combination card from the 180-degree position to the 270-degree location, and then rotates clockwise to the 45-degree position. The watermark detector determines that directional changes occurred at 0-180-270-45. These positions are used as the entered combination. Tracking the direction of changes in the rotation angle can help to reduce the probability of malicious entry into the system by someone who tries a series of random rotations.

In still another embodiment, instead of tracking directional changes, a compliant watermark reader uses a "rest position" as a combination tumble. A rest position is a position at which the card is held stationary (or stationary within a predetermined tolerance, e.g., 5 degrees) for at least a predetermined amount of time (e.g., 2-15 seconds). From a system's perspective, the rest position can be determined by identifying when rotation angles remain the same, or within a predetermined tolerance range, for at least the predetermined amount of time. For example, a combination card is held at a 10 degree position for at least the predetermined time, then at 100 degrees, then at 270 degrees, and finally at 0 degrees. The compliant reader then uses positions 10-100-270-0 as the entered combination. Such is compared against a stored combination to determine entry, access, or to otherwise unlock a combination.

In yet another embodiment, a user must perform the combination in a given amount of time. This restriction helps to prevent a would-be-thief from arbitrarily or systematically presenting different combinations, in hopes of stumbling onto the right combination. Alternatively, a predetermined number of consecutive wrongly entered combinations freezes the account. (For example, after five wrong combination attempts, an account is frozen and must be reset by a system administrator or via a predetermined procedure, such as with a password/PIN.).

Figure 15:
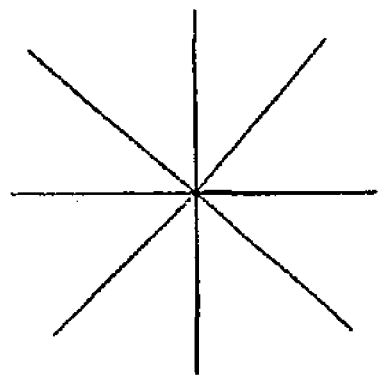
FIG. 15 illustrates a combination card including visual clues.

A combination card can be printed to include various visual clues, such as tick marks, a clock face, arrows, marks, lines, cross lines, text, numbers, graphics, etc. FIG. 15 illustrates but one such example. A user can align the tick marks to help position the combination card during various rotations. For example, a user can position a card at 3 o'clock, 6 o'clock and 10 o'clock, according to the clock ticks, to complete a combination.

A combination card can include a disc-shape. A disc-shaped combination card can include visual clues, such as lines, ticks or other positioning marks. The disc-shaped card can then be positioned like above. In a related embodiment, a combination card alignment device is used, possibly in conjunction with positioning aids such as notches on the card, to help accurately position the card. Take the disc-shaped combination card for example. The disc is inserted into or positioned by the alignment device. The visual clues can be used to align the card at various rotation positions. The alignment device can be rotated to various states to perform the combination. Alternatively, the disc-shaped card can be extracted from the alignment device and replaced at a different rotation angle to perform the combination. (Of course, such an alignment device can be positioned beneath or adjacent to an input device, such as a web camera, digital camera, optical or image sensor, etc.).

In addition to using rotation angles in a combination, other orientation parameters can be optionally used in the combination. Scale (e.g., magnification) is one such parameter. For example, a combination may include a 90-degree rotation angle at a first scale, and a 270-degree rotation angle at a second scale. Different scale values can be achieved by relatively positioning a combination card with respect to an input device. (For example, a first scale may correspond with an input device distance-to-card of 2-10 inches, while a second scale may correspond with a 10-15 inch distance.). Even the alignment device mentioned above can be used to help accurately position a combination card to achieve different scale values. Other orientation parameters such as translation (in X and Y directions) can also be used instead of, or in addition to, the above parameters.

The above-described combination lock embodiments may benefit from optionally accepting combination tumbles or positions within a predetermined tolerance. For example, if the first tumble in a combination is 90 degrees (or 3 o'clock), a watermark-based combination lock may accept as a correct input 85-95 degrees. Of course, an acceptable tolerance range can be determined according to system needs (e.g., the level of security desired) and/or precision of the compliant watermark reading device. Furthermore, the terms "clockwise" and "counterclockwise" in this section are used interchangeably, and may describe a frame-of reference based on a card, user or input device.

There are many other uses for a watermark-based combination lock, besides security or access control. Consider using watermark rotation input in an interactive game. To illustrate, a gamer wears a digitally watermarked glove (or holds a watermarked object or document) and moves or rotates the glove to "virtually" interact with a game. Corresponding movements (or feedback) are preferably provided to the gamer via a computer display. The game software uses rotation and/or scale values determined from the glove (and compliant watermark reader) to provide an interactive gaming experience. The gamer may virtually open a door, unlock a safe, or pull a secret lever, etc. with such techniques.

Consider also using a combination card in social settings, such as a party. Only guests in the know use a watermarked invitation in conjunction with a combination to receive special party or event instructions, or to gain party entrance. These are just a few of the many applications involving watermark orientation information as computer input.

According, a combination lock provides many unique advantages. One such advantage is that the combination card cannot be used for unlocking a watermark-based combination lock without knowledge of the combination. As a result, lost or stolen combination cards pose a relatively low security risk. Of course, there are many other advantages.

Voting System

Another aspect of the present invention utilizes digitally watermarked documents in an online (e.g., internet or other network) voting system. Registered voters receive a digitally watermarked ballot (or other watermarked document). The ballot preferably includes an embedded voting identifier that helps to facilitate access to a voting website (or other network interface). In one embodiment, the identifier is used to link to an appropriate voting web site. For example, the identifier is provided to a database to index a corresponding URL or IP address stored in a database. In another embodiment, the identifier provides an additional security feature or verifies an ability to vote. (For example, verifying an ability to vote may include identifying an eligible voter, verifying voter eligibility, identifying a registered voter, verifying residency or citizenship, anomalously identifying a voter, pointing to a voter identifier or account, etc.). In the preferred embodiment, a voter must have physical possession of the watermarked ballot (or other voter document) to be able to vote. (In this case, the ballot is presented to a watermark reader, which extracts the embedded identifier, and passes the extracted identifier to a central or distributed voting server. The identifier can be compared against a list or range of valid identifiers.). Of course, a watermarked ballot can be used in combination with other security features, such as a password or PIN. In this case, a voter demonstrates both physical possession of a watermark ballot (or other document), and knowledge of a password or PIN.

Instead of using a watermarked ballot, another embodiment verifies identity with watermarked driver's licenses, passports, and/or ID cards. An embedded identifier in such a document can be extracted and used to verify identity. For example, a voting system interfaces with a division of motor vehicles (DMV) database to match extracted identifiers with corresponding driver's license identifiers. (Of course, such information can otherwise be shared with a voting server.). Alternatively, a central database manages identifiers for both the DMV and voting system. Voter identity or eligibility can be verified as such.

Once voter identity is verified as discussed above, the actual voting selection is preferably designed to protect voter anonymity. Also, instead of voting, such systems and methods described above may be used to register voters.

Using Digitally Watermark Driver's Licenses to Verify Age

Watermarked driver's licenses (or other ID cards, including a passport) can be used to verify age and/or other personal information. To implement, a driver's license is embedded with an identifier. The identifier is used to link to additional information (e.g., age, address, citizenship, name, social security number, physical characteristics such as height, weight, hair and eye color, and/or an image of the card holder, etc.) stored in a central or distributed database. Of course, a central server or a distributed server can maintain the database.

When presented to a watermark reader, the identifier is extracted and conveyed to the database. The database is interrogated with the identifier to find the additional information. The information can be passed back to the watermark reader.

In one implementation, a watermark reader (or an online server in communication with such) determines whether the watermark license holder is old enough to enter an online web site (such as an adult-oriented web site). Another implementation is used by clubs, casinos, and/or alcohol-serving establishments to verify a license holder's age. (A watermarked license can be used in connection with so-called fragile watermarks to even further enhance security and prevent tampering. A fragile watermark typically degrades predictably or destructs upon copy and print processing, or digitally reproducing and then printing.).

In another embodiment, instead of embedding a database-linked identifier in an ID card, a card is embedded with another payload. In this embodiment, the payload itself conveys the age (and/or other information) of the cardholder. Typically, the payload may include from 2-256 bits of information, which can be used by a watermark reader to determine age, and other related information.

Concluding Remarks

The foregoing are just exemplary implementations of secure online transaction systems. It will be recognized that there are a great number of variations on these basic themes. The foregoing illustrates but a few applications of the detailed technology. There are many others.

Consider, for example, the use of embedded watermark data in a document to allow access to a resource. A card may be used to grant physical access through a normally locked door. Or a card may be used to logon to a computer network—with directory privileges tied to the data decoded from the card.

Entry of a user's PIN code, or other identity check, may be desirable in certain contexts, e.g., to guard against granting access to a person who has found or stolen someone else's card. Security is further enhanced when a user possesses both i) a physical document, and ii) corresponding verification data (e.g., password, PIN, retinal scan, voice recognition, biometric verification data, etc). To illustrate, in order to gain system or network access (or to login), a user must demonstrate physical possession of document. A compliant reader reads and extracts embedded data from the document. The embedded data is used to index or otherwise identify corresponding verification data. The corresponding verification data is preferably predetermined and stored for comparison. The user is prompted to provide the verification data (e.g., to provide a PIN, yield to a fingerprint or retinal scan, etc.). (The user may be prompted to provide such verification data prior to, or after, presentment of the document). System access is granted only when the provided verification data correctly corresponds with the predetermined verification data. This multi-step security (e.g., physical possession and verification data) is valuable in many environments, including authentication to a network, access to a software application, verification of identity, verification of permissions, login security, restricted access management, etc. The basic system functionality as shown in FIG. 2 may be used to facilitate such. Of course, a link between a client and host also may be used to facilitate such a verification process.

In some cases, the data encoded in the card fully replicates certain information associated with the card (e.g., the bearer's last name or initials, or OCR printing, or mag-stripe data, etc.). Or the encoded data can be related to other information on the card in a known way (e.g., by a hash function based on the bearer's printed name, or the full-text card contents). Or the encoded data can be unrelated to other information on the card. In many embodiments, the data encoded in the card may serve as an index to a larger repository of associated data stored in a remote database, e.g., on computer 30. Thus, for example, an index datum read from a passport may allow a passport inspector to access a database record corresponding to the encoded data. This record may include a reference photograph of the passport holder, and other personal and issuance data. If the data obtained from the database does not match the text or photograph included on the card, then the card has apparently been altered.

Whereas specific bit lengths and string names have been used for illustrative purposes, it will be appreciated that the present invention is not so limited. Instead, data of differing lengths and names may be used. Also, whereas specific components for the various tickets have been used for illustrative purposes, it will be appreciated by those skilled in the art that a ticket could include alternative components, so long as some form of identifying features remain.

Having described and illustrated the principles of the invention with reference to illustrative embodiments, it should be recognized that the invention is not so limited.

As a further alternative, the embedded data may be infrared (IF) or ultraviolet (UV) sensitive. The embedding can be effected using IF or UV ink. For example, the CCD or CMOS detector of most cameras (under normal lighting) detects some of the UV spectrum. The effect can be enhanced by illuminating the object with black light in order to fluoresce the mark at the time of imaging—making the mark visible to the camera.

The particular combinations of elements and features in the above-detailed embodiments are exemplary only; the interchanging and substitution of these teachings with other teachings in this application are also contemplated.

The above-described methods and functionality can be facilitated with computer executable software stored on computer readable mediums, such as electronic memory circuits, RAM, ROM, magnetic media, optical media, removable media, etc. Such software may be stored on a user terminal, and/or distributed throughout a network. Data structures representing the various data strings may also be stored on such computer readable mediums.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
   receiving optical data from an optical sensor, the optical data being associated with an object presented to the optical sensor, wherein the object comprises optically-detectable, machine-readable indicia encoded using digital watermarking, said indicia comprising an orientation component and an identifier;
   determining, at a electronic processor a series of orientations of the orientation component;
   transmitting the identifier to a server;
   receiving a series of expected orientations based on the identifier;
   comparing the series of expected orientations with the determined series of orientations; and
   determining an access status based on the comparison.

2. The method of claim 1, wherein, if the series of expected orientations corresponds with the determined series of orientations, the access status comprises access allowed.

3. The method of claim 1, wherein, if the series of expected orientations does not correspond with the determined series of orientations, the access status comprises access not allowed.

4. The method of claim 1, wherein the indicia is configured to be unintelligible to human viewers.

5. The method of claim 1, wherein the access status is associated with a physical facility.

6. The method of claim 1, wherein the access status is associated with a remotely located network resource.

7. The method of claim 1, wherein the access status is associated with a computer file.

8. The method of claim 1, wherein the access status is associated with a location.

9. The method of claim 1, wherein the series of expected orientations comprises a combination lock.

10. The method of claim 1, wherein determining the series of orientations of the orientation component comprises performing a domain transform of the optical data.

11. The method of claim 10, wherein the domain comprises a frequency domain.

12. An apparatus comprising:
    a electronic processor configured to:
    receive optical data from an optical sensor, the optical data being associated with an object presented to the optical sensor, wherein the object comprises optically-detectable, machine-readable indicia encoded using digital watermarking, said indicia comprising an orientation component and an identifier;
    determine a series of orientations of the orientation component;
    transmit the identifier to a server;
    receive a series of expected orientation based on the identifier;
    compare the series of expected orientations with the determined series of orientations; and
    determine an access status based on the comparison.

13. The apparatus of claim 12, wherein, if the series of expected orientations corresponds with the determined series of orientations, the access status comprises access allowed.

14. The apparatus of claim 12, wherein, if the series of expected orientations does not correspond with the determined series of orientations, the access status comprises access not allowed.

15. The apparatus of claim 12, wherein the indicia is configured to be unintelligible to human viewers.

16. The apparatus of claim 12, wherein the access status is associated with a physical facility.

17. The apparatus of claim 12, wherein the access status is associated with a remotely located network resource.

18. The apparatus of claim 12, wherein the access status is associated with a computer file.

19. The apparatus of claim 12, wherein the access status is associated with a location.

20. The apparatus of claim 12, wherein the series of expected orientations comprises a combination lock.

21. The apparatus of claim 12, wherein determining the series of orientations of the orientation component comprises performing a domain transform of the optical data.

22. The apparatus of claim 21, wherein the domain comprises a frequency domain.

23. A non-transitory computer-readable storage medium having instructions stored thereon that, when executed by a computing device, cause the computing device to perform operations comprising:
    receiving optical data from an optical sensor, the optical data being associated with an object presented to the optical sensor, wherein the object comprises optically-detectable, machine-readable indicia encoded using digital watermarking, said indicia comprising an orientation component and an identifier;
    determining a series of orientations of the orientation component;

transmitting the identifier to a server;
receiving a series of expected orientations based on the identifier;
comparing the series of expected orientations with the determined series of orientations; and
determining an access status based on the comparison.

24. The non-transitory computer-readable storage medium of claim 23, wherein, if the series of expected orientations corresponds with the determined series of orientations, the access status comprises access allowed.

25. The non-transitory computer-readable storage medium of claim 23, wherein, if the series of expected orientations does not correspond with the determined series of orientations, the access status comprises access not allowed.

26. The non-transitory computer-readable storage medium of claim 23, wherein the indicia is configured to be unintelligible to human viewers.

27. The non-transitory computer-readable storage medium of claim 23, wherein the access status is associates with a physical facility.

28. The non-transitory computer-readable storage medium of claim 23, wherein the access status is associated with a remotely located network resource.

29. The non-transitory computer-readable storage medium of claim 23, wherein the access status is associated with a computer file.

30. The non-transitory computer-readable storage medium of claim 23, wherein the access status is associated with a location.

31. The non-transitory computer-readable storage medium of claim 23, wherein the series of expected orientations comprises a combination lock.

32. The non-transitory computer-readable storage medium of claim 23, wherein determining the series of orientations of the orientation component comprises performing a domain transform of the optical data.

33. The non-transitory computer-readable storage medium of claim 32, wherein the domain comprises a frequency domain.

* * * * *

UNITED STATES PATENT AND TRADEMARK OFFICE
CERTIFICATE OF CORRECTION

| | | |
|---|---|---|
| PATENT NO. | : 7,958,359 B2 | Page 1 of 1 |
| APPLICATION NO. | : 10/275197 | |
| DATED | : June 7, 2011 | |
| INVENTOR(S) | : Sharma et al. | |

It is certified that error appears in the above-identified patent and that said Letters Patent is hereby corrected as shown below:

Page 2, item (56), under "U.S. Patent Documents", in Column 1, Line 28, below "5,845,008 A 12/1998 Katoh et al." insert -- 5,862,260 A 1/1999 Rhoads --.

Page 2, item (56), under "U.S. Patent Documents", in Column 2, Line 63, below "2005/0271246 A1 12/2005 Sharma et al." insert -- 2007/0027818 A1 2/2007 Lofgren et al. --.

Page 3, item (56), under "Other Publications", in Column 1, Line 2, delete "Ridriguez et al." and insert -- Rodriguez et al. --.

Page 3, item (56), under "Other Publications", in Column 2, Line 26, delete "web" and insert -- web page: --.

Column 23, line 51, in Claim 1, delete "a electronic processor" and insert -- an electronic processor, --.

Column 24, line 17, in Claim 12, delete "a electronic" and insert -- an electronic --.

Column 24, line 27, in Claim 12, delete "orientation" and insert -- orientations --.

Column 24, lines 39-40, in Claim 15, delete "configuered" and insert -- configured --.

Column 24, line 64, in Claim 23, delete "watermaking," and insert -- watermarking, --.

Column 25, line 20, in Claim 27, delete "associates" and insert -- associated --.

Signed and Sealed this
Eighteenth Day of October, 2011

David J. Kappos
*Director of the United States Patent and Trademark Office*